US00RE37895E

(19) United States
(12) Reissued Patent
Kuroda et al.

(10) Patent Number: US RE37,895 E
(45) Date of Reissued Patent: Oct. 29, 2002

(54) EVAPORATIVE FUEL-PROCESSING SYSTEM FOR INTERNAL COMBUSTION ENGINES

(75) Inventors: Shigetaka Kuroda, Wako (JP); Kazutomo Sawamura, Wako (JP); Masayoshi Yamanaka, Wako (JP); Hiroshi Maruyama, Wako (JP); Masataka Chikamatsu, Wako (JP); Shoichi Nemoto, Wako (JP); Takeshi Suzuki, Wako (JP)

(73) Assignee: Honda Giken Kogyo Kabushiki Kaisha, Tokyo (JP)

(21) Appl. No.: 08/620,299

(22) Filed: Mar. 22, 1996

Related U.S. Patent Documents

Reissue of:
(64) Patent No.: 5,299,545
Issued: Apr. 5, 1994
Appl. No.: 07/942,875
Filed: Sep. 10, 1992

(30) Foreign Application Priority Data

| | | |
|---|---|---|
| Sep. 13, 1991 | (JP) | 3-262857 |
| Dec. 27, 1991 | (JP) | 3-360629 |
| Dec. 27, 1991 | (JP) | 3-360630 |
| Jan. 10, 1992 | (JP) | 4-021711 |

(51) Int. Cl.[7] ..... F02M 33/02
(52) U.S. Cl. ..... 123/520; 123/198 D
(58) Field of Search ..... 123/520, 521, 123/518, 519, 516, 198 D

(56) References Cited

U.S. PATENT DOCUMENTS

| | | | | | |
|---|---|---|---|---|---|
| 4,949,695 | A | * | 8/1990 | Uranashi | 123/198 D |
| 4,962,744 | A | * | 10/1990 | Uranishi et al. | 123/520 |
| 5,113,834 | A | * | 5/1992 | Aramari | 123/198 D |
| 5,143,035 | A | * | 9/1992 | Kayanuma | 123/198 D |
| 5,146,902 | A | * | 9/1992 | Cook et al. | 123/518 |
| 5,150,689 | A | * | 9/1992 | Yano | 123/198 D |
| 5,158,054 | A | * | 10/1992 | Otsuka | 123/198 D |
| 5,158,059 | A | * | 10/1992 | Kuroda | 123/690 |
| 5,186,153 | A | * | 2/1993 | Steinbrenner et al. | 123/519 |
| 5,191,870 | A | * | 3/1993 | Cook | 123/520 |
| 5,193,512 | A | * | 3/1993 | Steinbrenner et al. | 123/520 |
| 5,195,498 | A | * | 3/1993 | Siebler et al. | 123/698 |
| 5,197,442 | A | * | 3/1993 | Blumenstock et al. | 123/520 |
| 5,275,144 | A | * | 1/1994 | Gross | 123/198 D |
| 5,297,527 | A | | 3/1994 | Suzuki et al. | |
| 5,315,980 | A | | 5/1994 | Otsuka et al. | |

* cited by examiner

*Primary Examiner*—Carl S. Miller
(74) *Attorney, Agent, or Firm*—Arent Fox Kintner Plotkin & Kahn, PLLC

(57) ABSTRACT

An evaporative fuel processing system adapted to be capable of detecting abnormality of an evaporative emission control system for storing, in a canister, evaporative fuel from a fuel tank for holding fuel to be supplied to an internal combustion engine, and purging evaporative fuel into the intake system of the engine. A first control valve is arranged across a passage extending between the fuel tank and the canister. A second control valve is arranged across a passage extending between the canister and the intake system of the engine. A third control valve is provided for an air inlet part of the canister communicatable with the atmosphere. Through operating these control valves to open and close them, the evaporative emission control system is negatively pressurized, and abnormality of this system is detected based on the pressure detected in this negatively pressurized state thereof. Timing for carrying out abnormality determination is determined depending on conditions of the fuel tank. Before starting the whole process for abnormality diagnosis of the system evaporative fuel stored in the canister is allowed to be purged for a predetermined time period. When the temperature of fuel in the fuel tank exceeds a predetermined value, the abnormality determination is inhibited.

38 Claims, 23 Drawing Sheets

| FIG. 14 | |
|---|---|
| FIG. 14a | FIG. 14b |

EVAPORATIVE FUEL-PROCESSING SYSTEM FOR INTERNAL COMBUSTION ENGINES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an evaporative fuel-processing system for internal combustion engines, and more particularly to an evaporative fuel-processing system for internal combustion engines, which is capable of performing abnormality diagnosis of an evaporative emission control system for purging evaporative fuel generated from a fuel tank of the engine into an intake system of same.

2. Prior Art

Conventionally, there has been widely used an evaporative fuel-processing system for internal combustion engines, which comprises a fuel tank, a canister having an air inlet port provided therein, a first control valve arranged across an evaporative fuel-guiding passage extending from the fuel tank to the canister, and a second control valve arranged across a purging passage extending from the canister to the intake system of the engine.

A system of this kind temporarily stores evaporative fuel in the canister, which is then purged into the intake system of the engine.

Whether a system of this kind is normally operating can be checked, for example, by comparing a first value of an air-fuel ratio correction coefficient assumed when purging of evaporative fuel into the intake system is stopped and a second value of the air-fuel ratio correction coefficient assumed when purging of evaporative fuel is effected, after completion of warming-up of the engine. That is, when the evaporative fuel-processing system is normally functioning to purge evaporative fuel into the intake system, an air-fuel mixture supplied to the engine is enriched by the evaporative fuel purged. The enriched air-fuel mixture is detected by an air-fuel ratio sensor, e.g. an $O_2$ sensor, and hence the air-fuel ratio correction coefficient calculated for feedback control of the air-fuel ratio assumes a smaller value. Therefore, monitoring of the manner of decrease in the air-fuel ratio correction coefficient enables to determine abnormality of the evaporative fuel-processing system. This abnormality diagnosis method is disclosed in U.S. Pat. No. 5,085,194.

However, the above abnormality diagnosis method using the air-fuel ratio correction coefficient suffers from a problem that in the case where a leak of evaporative fuel occurs from defective seals provided at piping connections, valves, the fuel tank, etc. of the system, (e.g. a seal at a filler cap of the fuel tank), it is impossible to detect the leak by the above method, which can result in emission of a large amount of evaporative fuel into the air.

SUMMARY OF THE INVENTION

It is the object of the invention to provide an evaporative fuel-processing system for an internal combustion engine, which is capable of detecting abnormality of an evaporative emission control system, by detecting whether there occurs a leak of evaporative fuel from seals provided at piping connections, etc. of the system.

To attain the above object, according to a first aspect of the invention, there is provided an evaporative fuel-processing system for an internal combustion engine having an intake system including an evaporative emission control system, having a fuel tank a canister containing an adsorbent, the canister having an air inlet port communicatable with the atmosphere, an evaporative fuel-guiding passage extending between the canister and the fuel tank, a first control valve arranged across the evaporative fuel-guiding passage, an evaporative fuel-purging passage extending between the canister and the intake system, and a second control valve arranged across the evaporative fuel-purging passage.

The evaporative fuel-processing system according to the first aspect of the invention is characterized by having an abnormality-determining system which comprises:

tank internal pressure-detecting means for detecting pressure within the fuel tank;

negatively-pressurizing means for negatively pressurizing the evaporative emission control system; and abnormality-determining means for determining abnormality of the evaporative emission control system based on the pressure within the fuel tank detected after the evaporative emission control system has been negatively pressurized by the negatively-pressuring means.

Preferably, the abnormality-determining means determines the abnormality of the evaporative emission control system based on a rate of change in the pressure within the fuel tank occurring before the evaporative emission control system is set to a predetermined negatively-pressurized condition by the negatively-pressurizing means and a rate of change in the pressure within the fuel tank occurring after the predetermined negatively-pressurized condition of the evaporative emission control system has been established.

Preferably, the evaporative fuel-processing system includes tank condition-detecting means for detecting conditions of the fuel tank, wherein the abnormality-determining means carries out abnormality determination when a predetermined time period has elapsed after the evaporative emission control system was negatively pressurized the predetermined time period being corrected by a correcting time period set in response to the conditions of the fuel tank detected by the tank condition-detecting means.

Preferably, the abnormality-determining means determines abnormality of the evaporative emission control system by comparing a value of a parameter indicative a rate of change in the pressure within the fuel tank detected after the evaporative emission control system has been negatively pressurized by the negatively-pressurizing means with a predetermined reference value, the predetermined reference value being determined according to a time period required for setting the evaporative emission control system to the predetermined negatively-pressurized condition by the negatively-pressurizing means.

Preferably, the evaporative fuel-processing system includes means for purging evaporative fuel stored in the canister for a predetermined time period before the abnormality-determining process is started by the abnormality-determining system.

Preferably, the evaporative fuel-processing system includes fuel temperature-detecting means for detecting the temperature of fuel contained in the fuel tank, and determination-inhibiting means for inhibiting execution of abnormality-determining process by the abnormality-determining system when the fuel temperature detected exceeds a predetermined value.

According to a second aspect of the invention, the evaporative fuel-processing system is characterized by having an abnormality-determining system which comprises:

engine operating condition-detecting means for detecting operating conditions of the engine;

a third control valve for effecting and cutting off the communication of the air inlet port of the canister with the atmosphere;

tank internal pressure-detecting means for detecting pressure within the fuel tank;

negatively-pressurizing means for setting the evaporative emission control system to a predetermined negatively-pressurized condition by controlling the first to third control valves when it is detected by the the engine operating condition-detecting means that the engine is in operation;

a first rate of change-detecting means for detecting a rate of change in the pressure within the fuel tank caused by controlling opening and closing of the first control valve;

a second rate of change-detecting means for detecting a rate of change in the pressure within the fuel tank caused by closing the second control valve after the negatively-pressurized condition of the evaporative emission control system has been established; and abnormality-determining means for determining abnormality of the evaporative emission control system based on results of detection by the first and second rate of change-detecting means.

Preferably, the evaporative fuel-processing system of the second aspect of the invention also includes tank condition-detecting means for detecting conditions of the fuel tank, wherein the abnormality-determining means carries out abnormality determination when a predetermined time period has elapsed after the evaporative emission control system was negatively pressurized, the predetermined time period being corrected by a correcting time period set in response to the conditions of the fuel tank detected by the tank condition-detecting means.

Preferably, also in the evaporative fuel-processing system of the second aspect of the invention, the abnormality-determining means determines abnormality of the evaporative emission control system by comparing a value of a parameter indicative of a rate of change in the pressure within the the fuel tank detected after the evaporative emission control system has been negatively pressurized by the negatively-pressurizing means. With a predetermined reference value during the negatively pressurizing, the predetermined reference value being determined according to a time period required for setting the evaporative emission control system to the predetermined negatively-pressurized condition by the negatively-pressurizing means.

Preferably, the abnormality-determining system includes fuel amount-detecting means for detecting an amount of fuel contained in the fuel tank, the abnormality-determining means determines the abnormality of the evaporative emission control system based on results of detection by the first and second rate of change-detecting means and the fuel amount-detecting means.

Preferably, the evaporative fuel-processing system according to the second aspect of the invention also includes means for purging evaporative fuel stored in the canister for a predetermined time period before the abnormality-determining process is started by the abnormality-determining system.

Preferably, the evaporative fuel-processing system according to the second aspect of the invention also includes fuel temperature-detecting means for detecting the temperature of fuel contained in the fuel tank, and determination-inhibiting means for inhibiting execution of abnormality-determining process by the abnormality-determining system when the fuel temperature detected exceeds a predetermined value.

According to a third aspect of the invention, the evaporative fuel-processing system is characterized by having an abnormality-determining system which comprises:

engine operating condition-detecting means for detecting operating conditions of the engine;

a third control valve for effecting and cutting off the communication of the air inlet port of the canister with the atmosphere;

tank internal pressure-detecting means for detecting pressure within the fuel tank;

negatively-pressurizing means for setting the evaporative emission control system to a predetermined negatively-pressurized condition by controlling the first to third control valves when it is detected by the the engine operating condition-detecting means that the engine is in operation; and abnormality-determining means for effecting a determination as to whether or not the evaporative emission control system is abnormally functioning, when a predetermined time period has elapsed during the negatively-pressurizing process by the negatively-pressurizing means.

Preferably, the abnormality-determining system includes evaporative fuel generation rate-detecting means for detecting a parameter of an amount of evaporative fuel generated per unit time within the fuel tank, the abnormality-determining means determining that the evaporative emission control system is abnormal on condition that the parameter indicative of the amount of evaporative fuel generated per unit time within the fuel tank is smaller than a predetermined value.

The above and other objects, features, and advantages of the invention will become more apparent from the ensuing detailed description taken in conjunction with the accompanying drawings.

DETAILED DESCRIPTION

The invention will now be described in detail with reference to the drawings showing embodiments thereof.

Figure 1:
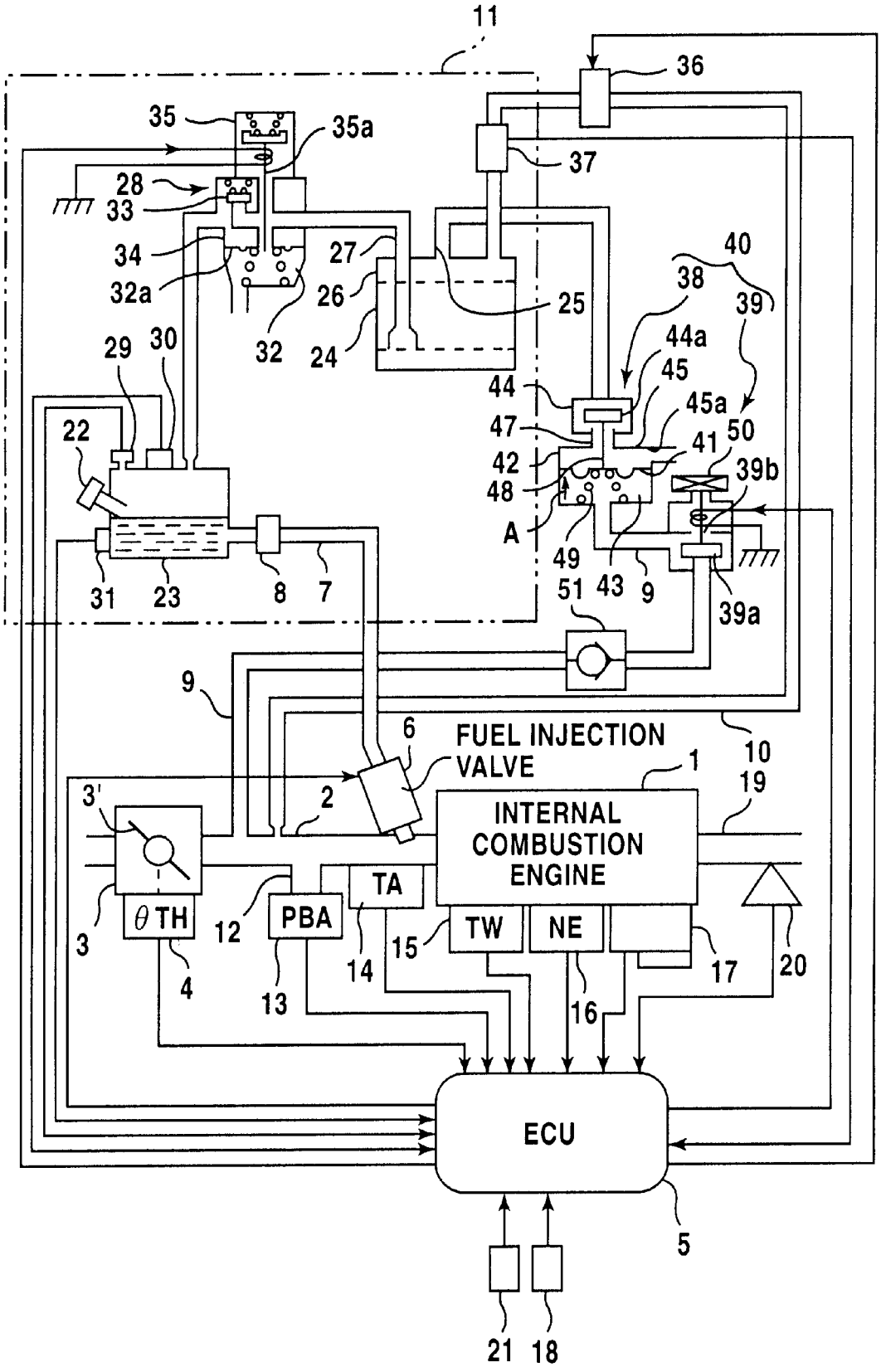
FIG. 1 is a schematic diagram showing the whole arrangement of an internal combustion engine and an evaporative fuel-processing system therefor according to an embodiment of the invention.

Referring first to FIG. 1, there is illustrated the whole arrangement of an internal combustion engine and an evaporative fuel-processing system therefor according to an embodiment of the invention.

In the figure, reference numeral 1 designates an internal combustion engine hereinafter simply referred to as "the engine") having four cylinders, not shown, for instance. Connected to the cylinder block of the engine I is an intake pipe 2 across which is arranged a throttle body 3 accommodating a throttle valve 3' therein. A throttle valve opening (θTH) sensor 4 is connected to the throttle valve 3' for generating an electric signal indicative of the sensed throttle valve opening and supplying same to an electronic control unit (hereinafter referred to as "the ECU") 5.

Fuel injection valves 6, only one of which is shown, are inserted into the interior of the intake pipe 2 at locations intermediate between the cylinder block of the engine I and the throttle valve 3' and slightly upstream of respective intake valves not shown. The fuel injection valves 6 are connected to a fuel pump 8 via a fuel supply pipe 7, and electrically connected to the ECU 5 to have their valve opening periods controlled by signals therefrom.

A negative pressure communication passage 9 and a purging passage 10 open into the intake pipe at respective locations downstream of the throttle valve 3', both of which are connected to an evaporative emission control system 11, referred to hereinafter.

Further an intake pipe absolute pressure (PBA) sensor 13 is provided in communication with the inferior of the intake pipe 2 via a conduit 12 opening into the intake passage 2 at a location downstream of an end of the purging passage 10 opening into the intake pipe 2 for supplying an electric signal indicative of the sensed absolute pressure within the intake pipe 2 to the ECU 5.

An intake air temperature (TA) sensor 14 is inserted into the intake pipe 2 at a location downstream of the conduit 12 for supplying an electric signal indicative of the sensed intake air temperature TA to the ECU 5.

An engine coolant temperature (TW) sensor 15 formed of a thermistor or the like is inserted into a coolant passage filled with a coolant and formed in the cylinder block, for supplying an electric signal indicative of the sensed engine coolant temperature TW to the ECU 5.

An engine rotational speed (NE) sensor 16 is arranged in facing relation to a camshaft or a crankshaft of the engine 1, neither of which is shown. The engine rotational speed sensor 16 generates a pulse as a TDC signal pulse at each of predetermined crank angles whenever the crankshaft rotates through 180 degrees, the pulse being supplied to the ECU 5.

A transmission 17 is interposed between driving wheels, not shown, and the engine 1, such that the driving wheels are driven by the engine 1 via the transmission 17.

A vehicle speed (VSP) sensor 18 is provided at the wheels for supplying an electric signal indicative of the sensed vehicle speed (VSP) to the ECU 5.

An oxygen concentration sensor (hereinafter referred to as "the $O_2$ sensor") 20 is mounted in an exhaust pipe 19 connected to the cylinder block of the engine 1, for sensing the concentration of oxygen present in exhaust gases emitted from the engine 1 and supplying an electric signal indicative of the sensed oxygen concentration to the ECU 5.

An ignition switch (IGSW) sensor 21 detects an ON (or closed) state of the ignition switch IGSW, to detect that the engine 1 is in operation, and supplies an electric signal indicative of the ON state of the ignition switch IGSW to the ECU 5.

The evaporative emission control system 11 is comprised of a fuel tank 23 having a filler cap 22 which is removed for refueling, a canister containing activated carbon 24 as an adsorbent and having an air inlet port 25 provided in an upper wall thereof, an evaporative fuel-guiding passage 27 connecting between 5 the canister 26 and the fuel tank 23, and a first control valve 28 arranged across the evaporative fuel-guiding passage 27.

The fuel tank 23 is connected to fuel injection valves 6 via the fuel pump 8 and the fuel supply pipe 7, and has tank internal pressure (PT) sensor (hereinafter referred to as "the PT sensor") 29 and a fuel amount (FV) sensor 30 (hereinafter referred to as "the FV sensor") both mounted at an upper wall thereof, and a fuel temperature (TF) sensor (hereinafter referred to as "the TF sensor") 31 penetrated through a side wall thereof. The PT sensor 29, FV sensor 30, and TF sensor 31 are electrically connected to the ECU 5. The PT sensor 29 senses the pressure (tank internal pressure PT) within the fuel tank 23 and supplies an electric signal indicative of the sensed tank internal pressure PT to the ECU 5. The FV sensor 30 senses an amount (FV) of fuel within the fuel tank 23 and supplies an electric signal indicative of the sensed fuel amount FV to the ECU . The TF sensor 31 senses the fuel temperature (TF) and supplies an electric signal indicative of the sensed fuel temperature TF to the ECU 5.

The first control valve 28 comprises a two-way valve 34 formed of a positive pressure valve 32 and a negative pressure valve 33, and a first electromagnetic valve 35 formed in one body with the two-way valve 34. More specifically, the first electromagnetic valve 35 has a rod 35*a* a front end of which is fixed to a diaphragm 32*a* of the positive pressure valve 32. Further, the first electromagnetic valve 35 is electrically connected to the ECU 5 to have its operation controlled by a signal supplied from the ECU 5. When the first electromagnetic valve 35 is energized, the positive pressure valve 32 of the two-way valve 34 is forcedly opened to open the first control valve 28, whereas when the first electromagnetic valve 35 is deenergized, the valving (opening/closing) operation of the first control valve 28 is controlled by the two-way valve 34 alone.

A purge control valve 36 (second control valve) is arranged across the purging passage 10, which has a solenoid, not shown, electrically connected to the ECU 5. The purge control valve 36 is controlled by a signal supplied from the ECU 5 to linearly change the opening thereof. That is, the ECU 5 supplies a desired amount of control current to the purge control valve 36 to control the opening thereof.

A hot-wire type flowmeter (mass flowmeter) 37 is mounted across the purging passage 10 at a location between the canister 26 and the purge control valve 36. The hot-wire type flowmeter 37 utilizes the nature of a platinum wire that when the platinum wire is heated by electric current applied thereto and at the same time exposed to a flow of gas, the platinum wire looses its heat to decrease in temperature so that its electric resistance decreases The output characteristic of the flowmeter 37 varies according to the concentration and flow rate of evaporative fuel, and a purging flow rate of a mixture of evaporative fuel and air, and the flowmeter 37 generates and supplies an output signal according to the varying output characteristic thereof, to the ECU 5.

A drain shut valve 38 is mounted across the negative pressure communication passage 9 connecting between the air inlet port 25 of the canister 26 and the intake pipe 2, and a second electromagnetic valve 39 is mounted across the negative pressure communication passage 9 at a location downstream of the drain shut valve 38, the drain shut valve 38 and the second electromagnetic valve 39 constituting a third control valve 40.

The drain shut valve 38 has an air chamber 42 and a negative pressure chamber 43 defined by a diaphragm 41. Further, the air chamber 42 is formed of a first chamber 44 accommodating a valve element 44*a*, a second chamber 45 formed with an air-introducing port 45*a*, and a narrowed communicating passage 47 connecting the second chamber 45 with the first chamber 44. The valve element 44*a* is connected via a rod 48 to the diaphragm 41. The negative pressure chamber 43 communicates with the second electromagnetic valve 39 via the communication passage 9, and has a spring 49 arranged therein for resiliently urging the diaphragm 41 and hence the valve element 44*a* in the direction indicated by an arrow A.

The second electromagnetic valve 39 is constructed such that when a solenoid thereof is deenergized, a valve element 39*a* thereof is in a seated position to allow air to be introduced into the negative pressure chamber 43 via an air inlet port 50 and an opening 39*b*, and when the solenoid is energized, the valve element 39*a* is in a lifted position to close the opening 39*b* so that the negative pressure chamber 43 communicates with the intake pipe 2 via the communication passage 9. In addition, reference numeral 51 indicates a check valve.

The ECU 5 comprises an input circuit having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU"), memory means storing programs executed by the CPU and for storing results of calculations therefrom, etc., and an output circuit which outputs driving signals to the fuel injection valves 6, the first and second electromagnetic valves 35, 39, and the purge control valve 36.

Figure 2:
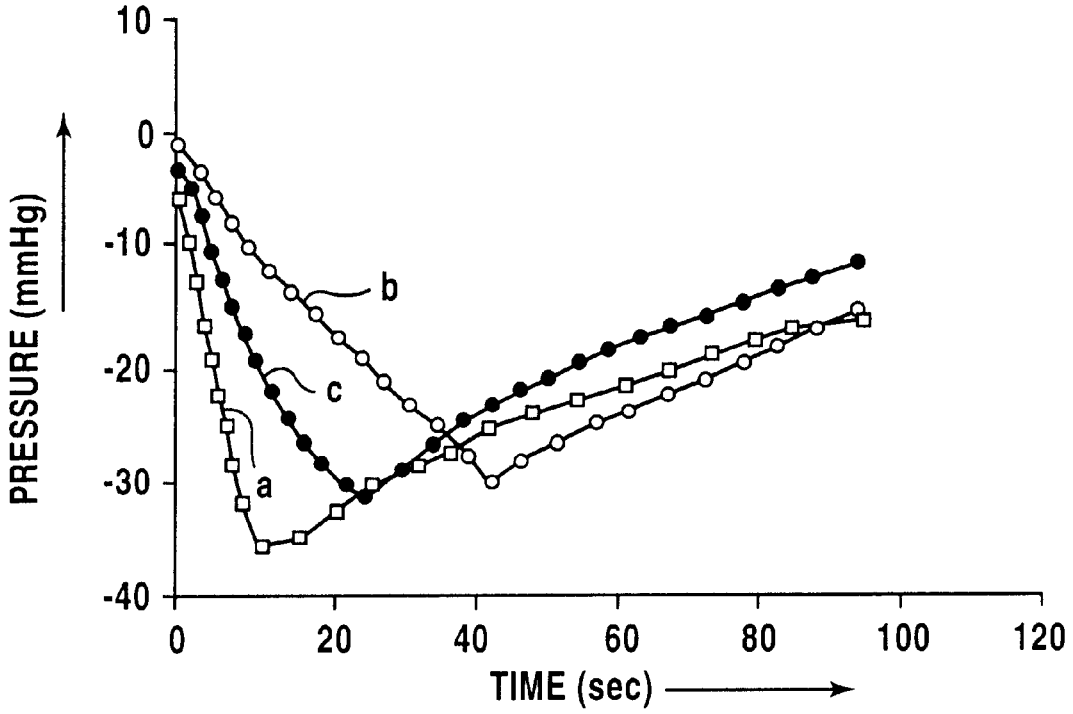
FIG. 2 is a graph showing test data obtained when there occurs no leak of evaporative fuel from the system.
Figure 3:
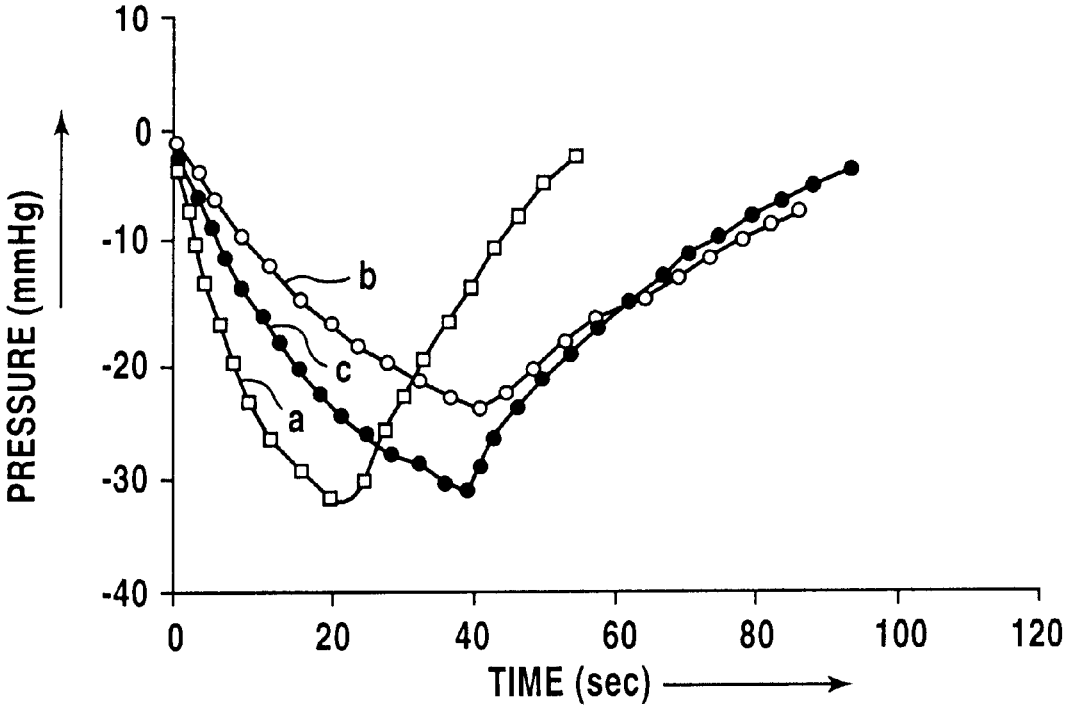
FIG. 3 is a graph showing test data obtained when there occurs a leak of evaporative fuel from the system.

The outline of the manner of detecting abnormality of the evaporative emission control system 11 in the evaporative fuel-processing system constructed as above will be described with reference to FIGS. 2 and 3. FIGS. 2 and 3 show changes in the pressure within the evaporative emission control system 11 which will occur as time elapses after negative pressure has been built within the system 11. FIG. 2 shows such changes in a case where no evaporative fuel leaks from the evaporative emission control system 11, while FIG. 3 shows such changes in a case where there occurs a leak of evaporative fuel from the system 11. Further, the symbol of a indicates a curve obtained when the fuel tank 23 is filled with the maximum amount of fuel, while the symbols b and c indicate curves obtained when the fuel tank contains ⅓ and ½ of the maximum amount, respectively.

As is clear from FIG. 2, when the evaporative emission control system 11 is held in a negatively-pressurized state, the pressure within the system 11 progressively increases toward the atmospheric pressure at a slow rate due to an insignificant or inevitably permitted amount of leak from seals of the valves, etc., even if the seals have good performance. However, as shown in FIG. 3, the rate of increase in the pressure within the system 11 in this case (and hence the rate of leak of evaporative fuel in a normal purging mode) increases when the sealing of piping connections, etc. of the system 11 is faulty. Since the pressure within the system 11 can be detected by the PT sensor 29, it is possible to determine abnormality of the system 11 based on the output from the PT sensor 29 outputted when the system is in the negatively-pressurized state.

Figure 4:
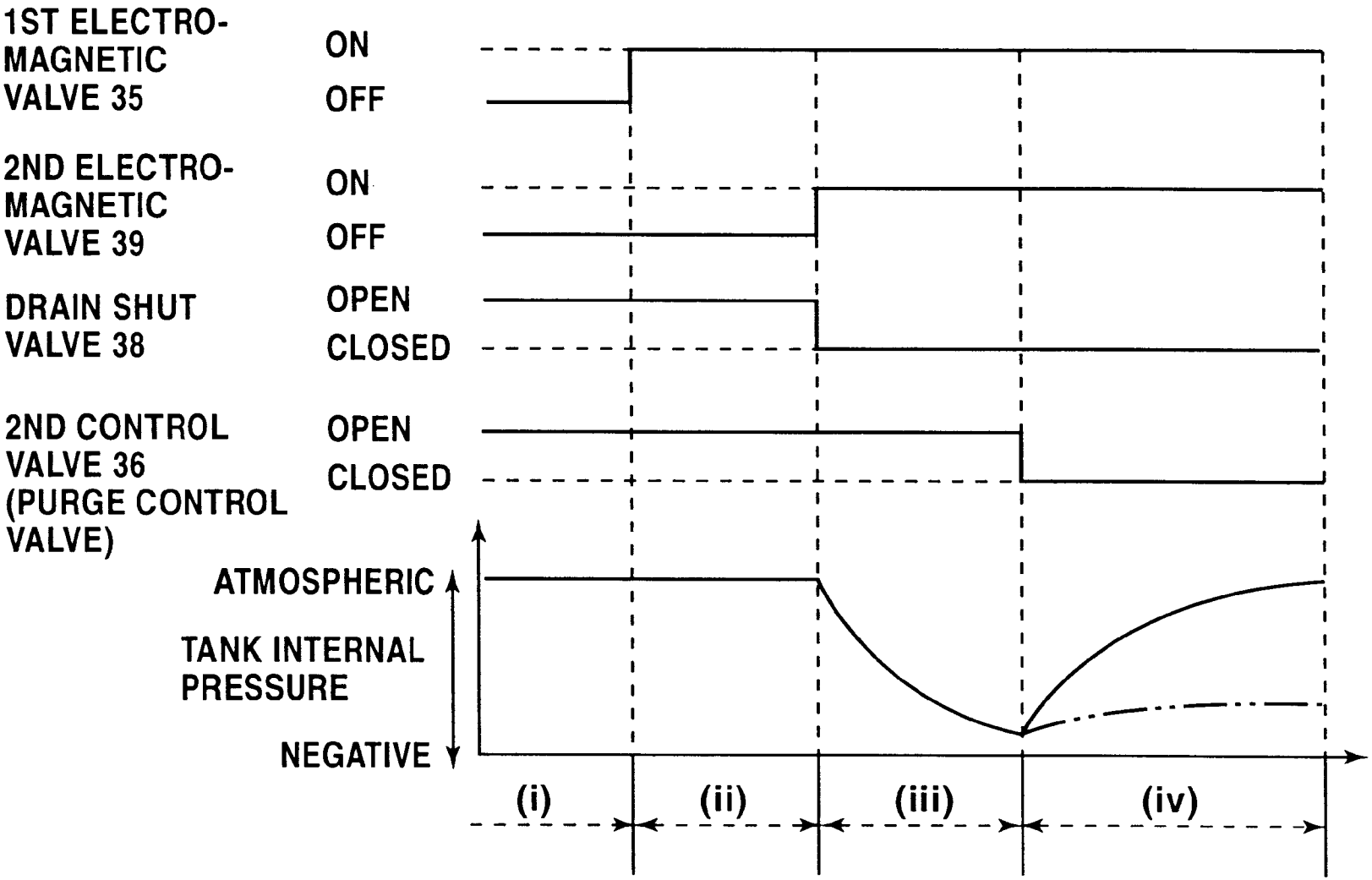
FIG. 4 is a timing chart showing operation of first and second electromagnetic valves, a drain shut valve, and a second control valve, and changes in pressure within a fuel tank (tank internal pressure), all appearing in FIG. 1.

FIG. 4 shows an example of changeover of operative states of the first and second electromagnetic valves 35, 39, the drain shut valve 38, and the second control valve 36 of the system, and changes in the tank internal pressure PT resulting therefrom.

Specifically, the first electromagnetic valve 35 and the second electromagnetic valve 39 are both deenergized, when the engine is under a normal operating condition (i.e. in a normal purging mode), as indicated by (i) in the figure. When the IGSW sensor 21 detects the ON (or closed) state of the ignition switch IGSW, i.e. the engine is in operation, the second control valve 36 is turned on or opened. In this state, the first control 15 valve 28 is controlled by the two-way valve 34. More specifically, when the tank internal pressure PT exceeds a preset value of the positive pressure valve 32 of the two-way valve 34, the positive pressure valve 32 opens to allow evaporative fuel generated from the fuel tank 23 to flow via the evaporative fuel-guiding passage 27 into the canister 26, where it is temporarily adsorbed by the adsorbent 24. As mentioned above, the second electromagnetic valve 39 is in the deenergized (OFF) state under the normal operating condition (i.e. in the normal purging mode), and hence the drain shut valve 38 is open, so that the outside air is supplied via the air-introducing port 45*a* to the canister 26, whereby evaporative fuel flowing into the canister is purged together with the outside air thus introduced, via the second control valve 36 through the purging passage 10.

When the fuel tank 23 is cooled by the outside air, etc., to increase the negative pressure within the tank 23, i.e. reduce the absolute pressure within the fuel tank 23, the negative pressure valve 33 of the two-way valve 34 is opened to allow evaporative fuel stored in the canister to return to the fuel tank 23.

When the engine 1 satisfies predetermined monitoring conditions, specified below, the first and second electromagnetic valves 35, 39, and the purge control valve 36 are operated in a manner described below to carry out an abnormality diagnosis of the evaporative emission control system 11.

First the tank internal pressure PT is relieved to the atmosphere, over a time period indicated by (ii) in FIG. 4. That is, the first electromagnetic valve 35 is turned on or energized to force open the first control valve 28, and at the same time the second electromagnetic valve 39 is held in the OFF state to keep the drain shut valve 38 open, further with the second control valve 36 being held in the energized (ON) state, to thereby relieve the tank internal pressure PT to the atmosphere.

Then, the pressure within the evaporative emission control system 11 is decreased, over a time period indicated by (iii) in FIG. 4. More specifically, while the first electromagnetic valve 35 and the second control valve 36 are held energized (ON), the second electromagnetic valve 39 is turned on, whereby the drain shut valve 38 is closed by a pulling force acting on the diaphragm 41 created by negative pressure within the negative pressure communication passage 9 communicating with the intake pipe 2. In this state, the evaporative emission control system 11 is negatively pressurized by a gas-drawing force created by negative pressure within the purging passage 10 communicating with the intake pipe 2.

Then, the leak down check is performed, over a time period indicated by (iv) in FIG. 4.

More specifically, the second control valve 36 is closed while the negative pressurized state established over the preceding time period 3 is maintained, followed by monitoring changes in the tank internal pressure PT by means of the PT sensor 29. If the sealing of the evaporative emission control system 11 is good, and hence there occurs no significant leakage of evaporative fuel from the system 11 when the engine is under the aforementioned normal operating condition, i.e. the normal purging mode, there hardly occurs a change in the tank internal pressure PT, as indicated by the two-dot chain line, whereas if the sealing of same is faulty, and hence there occurs a significant leak of evaporative fuel from the system 11 when the engine is under the normal operating condition or the normal purging mode, the tank internal pressure PT changes at a much larger rate than in the former case as indicated by the solid line, which enables to determine that the evaporative emission control system 11 is in an abnormal condition.

Next, there will be described in detail a manner of carrying out an abnormality diagnosis of the evaporative emission control system 11.

Figure 5:
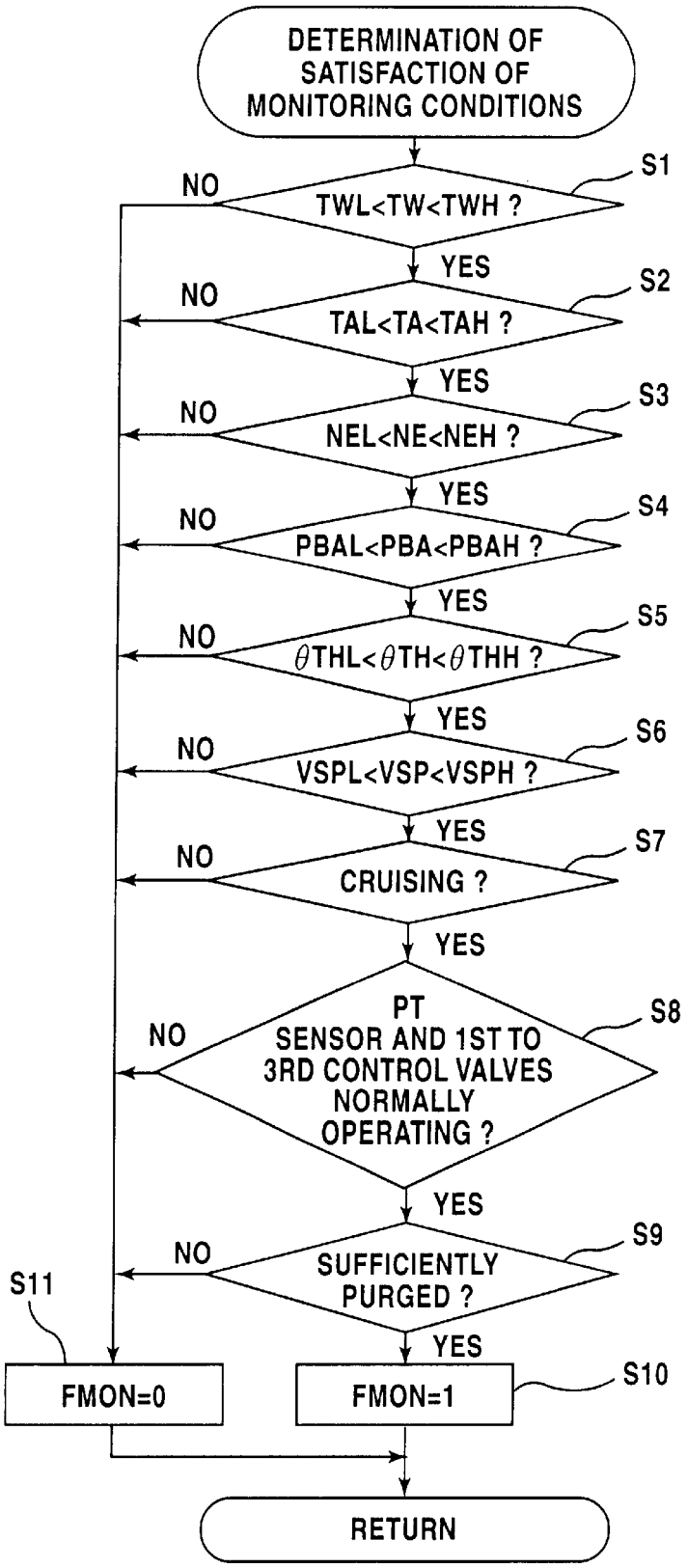
FIG. 5 is a flowchart of a routine for determining whether monitoring conditions are satisfied.

FIG. 5 shows a routine for determining whether the monitoring conditions are satisfied, which permit to carry out monitoring of the evaporative emission control system 11 with respect to leakage of evaporative fuel. The routine is executed as background processing.

First, at a step S1, it is determined whether or not the coolant temperature TW detected by the TW sensor 15 falls between a predetermined lower limit value TWL (e.g. 70° C.) and a predetermined higher limit value TWH (e.g. 90° C.). If the answer to this question is affirmative (YES), it is determined at a step S2 whether or not the intake air temperature TA detected by the TA sensor 14 falls between a predetermined lower limit value (e.g. 50° C.) and a predetermined higher limit value (e.g. 90° C.). If the answer to this question is affirmative (YES), it is judged that the warming-up of the engine 1 has been completed, and then the program proceeds to a step S3.

At the step S3, it is determined whether or not the engine rotational speed NE detected by the NE sensor 16 falls between a predetermined lower limit value NEL (e.g. 2000 rpm) and a predetermined higher limit value NEH (e.g. 4000 rpm). If the answer to this question is affirmative (YES), it is determined at a step S4 whether or not the intake pipe absolute pressure PBA detected by the PBA sensor 13 falls between a predetermined lower limit value PBAL (e.g. 350 mmHg) and a predetermined higher limit value PBAH (e.g. 610 mmHg). If the answer to this question is affirmative (YES), it is determined at a step S5 whether or not the throttle valve opening θTH detected by the θTH sensor 4 falls between a predetermined lower limit value θTHL (e.g. 1°) and a higher limit value θTHH (e.g. 5°). If the answer to this question is affirmative (YES), it is determined at a step S6 whether or not the vehicle speed VSP detected by the VSP sensor 21 falls between a predetermined lower limit value (eg. 53 Km/h) and a predetermined higher limit value (e.g. 61 Km/h). If the answer to this question is affirmative (YES), it is judged that the engine 1 has been warmed up and at the same time is in a stable operating condition, so that the program proceeds to a step S7.

At the step S7, it is determined whether or not the vehicle on which the engine 1 is installed is cruising. This determination of cruising of the vehicle is carried out by determining whether or not the vehicle has continued to travel with a change in the vehicle speed being equal to or smaller than a value of ±0.8 Km/sec. over two seconds. If the answer to this question is affirmative (YES), it is determined at a step S8 whether or not the PT sensor 29, and the first to third control valves 28, 36, 40 are normally operating. If the answer to this question is affirmative (YES), it is determined at a step S9, from the output from the hot-wire type flowmeter 37, whether or not the purging flow rate of a mixture of evaporative fuel and air flowing through the purging passage 10 shows a sufficient value. If the answer to this question is affirmative (YES), it is judged that the monitoring conditions are satisfied, so that a flag FMON is set to "1" at a step S10, followed by terminating the program. On the other hand, if at least one of the answers to the questions of the steps S1 to S9 is negative (NO), it is judged that the monitoring conditions are not satisfied, so that the flag FMON is set to "0" at a step S11, followed by terminating the program.

Figure 6A:
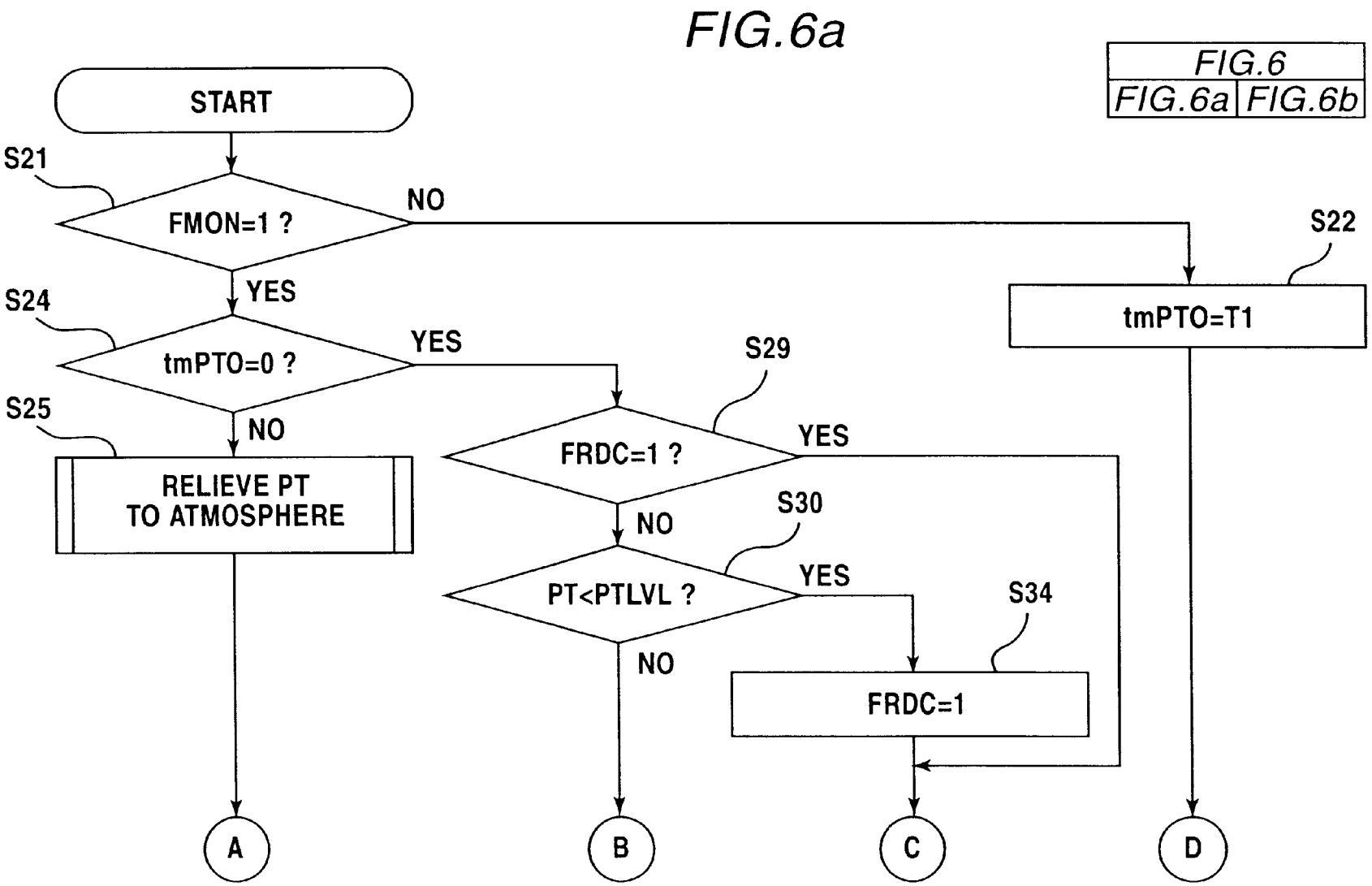
FIG. 6 is a flowchart of a program for carrying out abnormality diagnosis of an evaporative emission control system in FIG. 1.
Figure 6B:
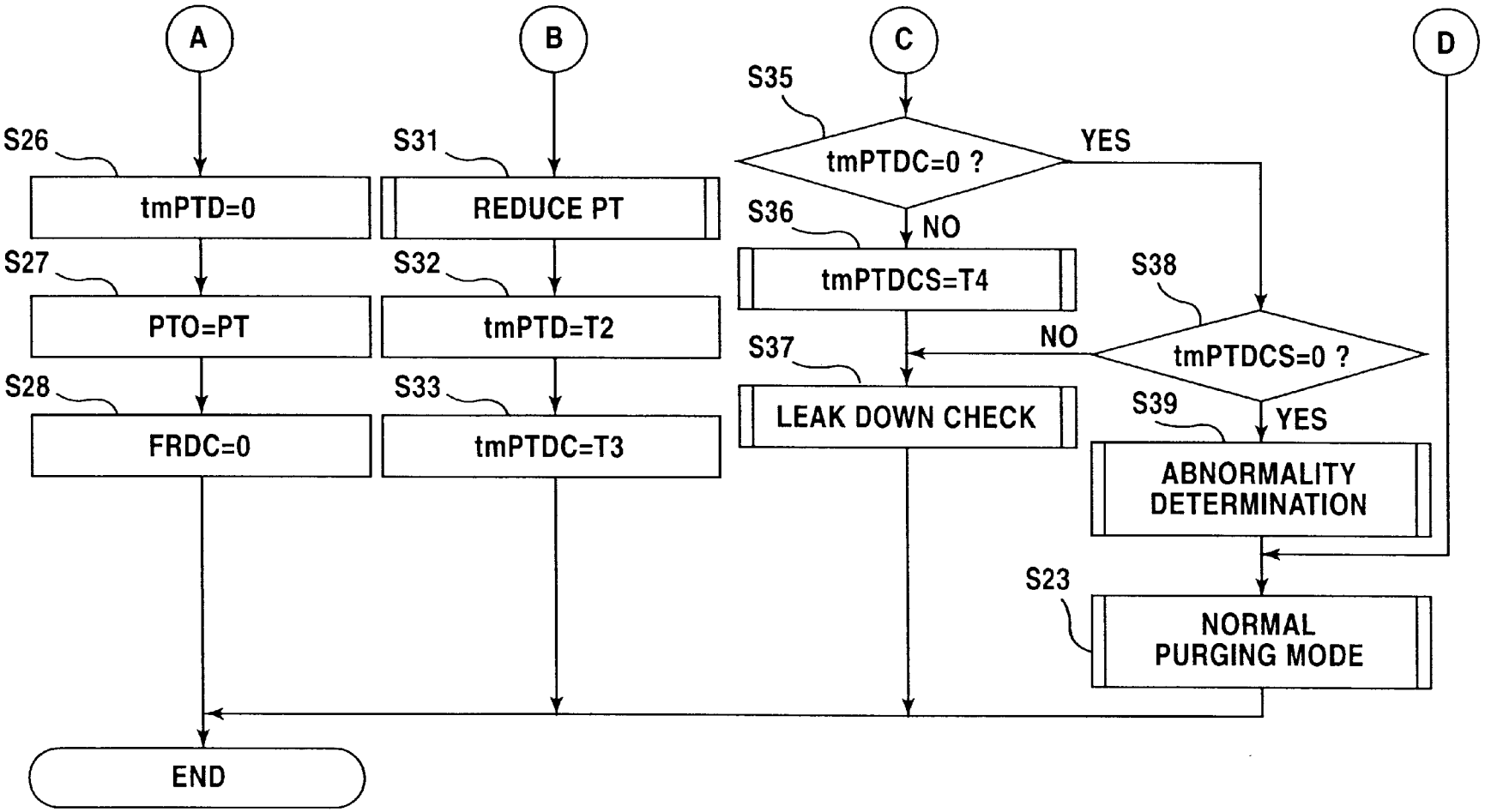

FIG. 6 shows a program for carrying out the abnormality diagnosis of the evaporative emission control system 11, which is executed by the ECU 5 of the evaporative fuel-processing system according to a first embodiment of the invention. This program is executed as background processing.

First, at a step S21, it is determined whether or not the flag FMON has been set to "1" in the monitoring condition-determining routine described above with reference to FIG. 5. Immediately after the engine 1 has been started, the monitoring conditions are not satisfied, and hence the answer to the question of the step S21 is negative (NO), so that the program proceeds to a step S22, where a first timer tmPTO, formed of a down-counter, is set to a predetermined time period T1, and started. The first timer tmPTO is provided to secure a sufficient time period for stabilizing the tank internal pressure PT after the tank internal pressure PT is relieved to the atmosphere, and accordingly the predetermined time period T1 assumes a value of 30 sec., for example. After the first timer tmPTO is started, the program proceeds to a step S23, where the evaporative emission control system 11 is set to the normal purging mode, i.e. the first and second electromagnetic valves 35, 39 are turned off and at the same time the second control valve 36 is turned on as shown at (i) in FIG. 4, followed by terminating the program.

If the monitoring conditions are satisfied in a subsequent loop, the flag FMON is set to "1", and hence the answer to the question of the step S21 becomes affirmative, so that the program proceeds to a step S24, where it is determined whether or not the count value of the first timer tmPTO has become equal to "0" to determined whether the predetermined time period T1 has elapsed. In the first execution of the step S24, the answer to this question is negative (NO), so that the program proceeds to a step S25, where the system 11 is set to the open-to-atmosphere mode. That is, as described hereinbefore (at the time period indicated by (ii) in FIG. 4), the first electromagnetic valve 35 and the second control valve 36 are held energized, and at the same time the second electromagnetic valve 39 is held deenergized. Then, a second timer tmPTD, formed of an up counter, is set to "0" at a step S26. The second timer tmPTD is provided to measure a time period elapsed before the negatively-pressurized condition of the evaporative emission control system 11 is established, as described hereinafter. The timer tmPTD is initially set to "0". Then, the tank internal pressure PTO assumed when the system 11 is in the open-to-atmosphere condition is set to a present value of the tank internal pressure PT detected by the PT sensor 29 at a step S27, and a flag FRDC, which is set to "1" when the negatively-pressurizing process is completed, is set to "0" at a step S28, followed by terminating the program. That is, the tank internal pressure PTO in the open-to-atmosphere condition is renewed to a present value of the PT, and the flag FRDC is reset, followed by terminating the program.

When the predetermined time period T1 has elapsed to make the count value of the first timer tmPTO equal to "0", in a subsequent loop, the answer to the question of the step S24 becomes affirmative (YES), so that the program proceeds to a step S29, where it is determined whether or not the flag FRDC is equal to "1". In the first execution of the step S29, the answer to this question is negative (NO), so that the program proceeds to a step S30, where it is determined whether or not the tank internal pressure PT is equal to or lower than a predetermined reference value PTLVL (e.g. −20 mmHg). In the first execution of the step S30, the evaporative emission control system 11 is in the open-to-atmosphere condition, and hence the inside-tank pressure PT is substantially equal to the atmospheric pressure, so that the answer to the question of the step S30 is negative (NO), and accordingly the program proceeds to a step S31 where the evaporative emission control system 11 is negatively pressurized. More specifically, as described hereinbefore with reference to FIG. 4 (see the time period (iii) in FIG. 4), the first and second electromagnetic valves 35, 39 and the second control valve 36 are all turned on or energized to create negative pressure within the evaporative emission control system 11. Then, at a step S32, the second timer tmPTD is set to a time period T2 required to create negative pressure within the system 11, i.e. a time period T2 elapsed after it was set to "0" at the step S26. The program then proceeds to a step S33, where a third timer tmPTDC, formed of a down counter, for leak down check is set to a predetermined time period T3, followed by terminating the program. The predetermined time period T3 assumes a value of e.g. 30 sec. which will be required for completing the leak down check.

When the negatively-pressurized condition of the evaporative emission control system 11 necessary for the leak down check is established, and hence the answer to the question of the step S30 becomes affirmative (YES), the flag FRDC is set to "1" at a step S34, and then the program proceeds therefrom to a step S35, where it is determined whether or not the count value of the third timer tmPTDC is equal to "0" to judge whether the time period required for completing the leak down check has elapsed.

In the first execution of the step S35, the answer to the question of the step S35 is negative (NO), so that the program proceeds to a step S36, where a fourth timer tmPDTDCS for correcting the leak down check is set to a predetermined time period T4. The correcting time period T4 is calculated based on conditions of the fuel tank 23 (fuel amount, fuel temperature, tank internal pressure, negatively-pressurizing time period), and provided to retard abnormality diagnosis to be performed at a step S39, described hereinafter. The reason for retarding the timing for execution of abnormality diagnosis depending on the conditions of the fuel tank 23 is as follows:

When the fuel tank 23 is substantially fully filled with fuel, the volume of space above fuel of the fuel tank 23 is small, so that the tank internal pressure PT increases at a higher speed as is obvious from FIG. 3, whereas when the amount of fuel contained in the fuel tank 23 is small, the tank internal pressure PT increases at a lower speed, after establishment of the negatively-pressurized condition of the evaporative emission control system 11. Therefore, depending on the amount of fuel contained in the fuel tank 23, there can be made an erroneous determination as to abnormality of the system 11. Further, if a longer time period is required in establishing the negatively-pressurized condition of the system 11, it takes a longer time period to complete the leak down check, and therefore it may be required to modify the manner of determining abnormality depending on the time period required in establishing the negatively-pressurized condition of the system 11. Further, when the fuel temperature is high, the amount of evaporative fuel generated within the fuel tank 23 is large, so that the tank internal pressure PT increases at a higher speed, which can lead to an erroneous detection of abnormality of the system 11. Further, when the tank internal pressure in the open-to-atmosphere condition is high, which means the atmospheric pressure outside the system is high it takes a short time period for the tank internal pressure PT, after the system has been negatively pressurized, to rise to a predetermined reference value, mentioned hereinafter, which can result in an erroneous detection of abnormality of the system 11. Therefore, in order to prevent such erroneous determinations of abnormality, the timing for starting the execution of abnormality determination is corrected depending on the conditions of the fuel tank 23.

Figure 7:
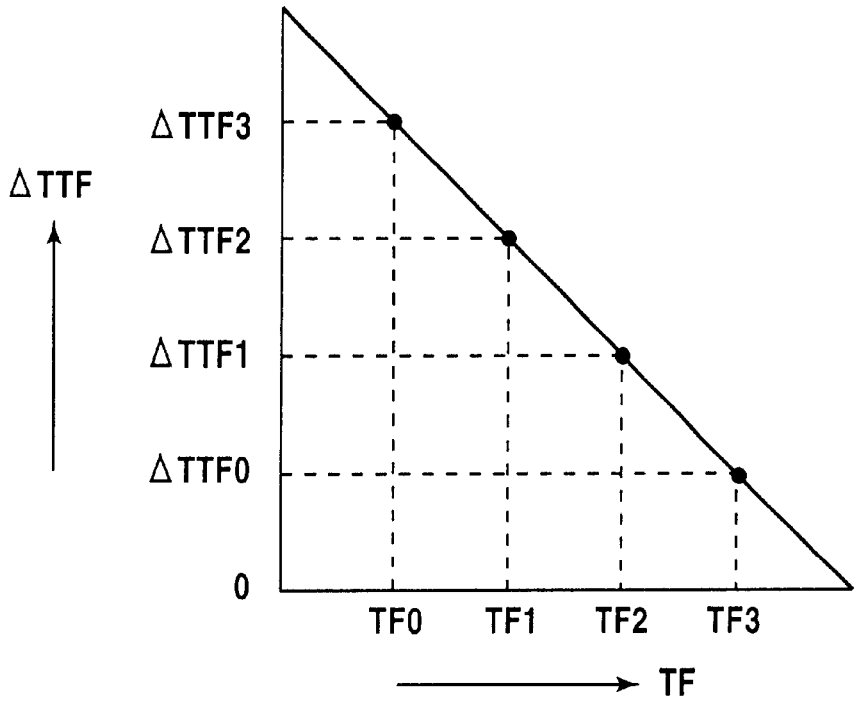
FIG. 7 shows a table for calculating a parameter (fuel temperature-dependent correcting time period ΔTTF) used for the abnormality diagnosis.

More specifically, the correcting time period T4 is calculated by the use of the following equation (1):

$$T4=\Delta TTF+\Delta TVF+\Delta TPTO+\Delta TtmPTD \ldots \quad (1)$$

where ΔTTF represents a fuel temperature-dependent correcting time period, which is calculated by retrieving a ΔTTF map stored in the memory means of the ECU 5. The ΔTTF map can be set, e.g. as shown in FIG. 7, such that predetermined values ΔTTF0 to ΔTTF3 are provided corresponding, respectively, to predetermined fuel temperature values TF0 to TF3. A value of the correcting time period ΔTTF is read from the ΔTTF map or calculated by interpolation.

Figure 8:
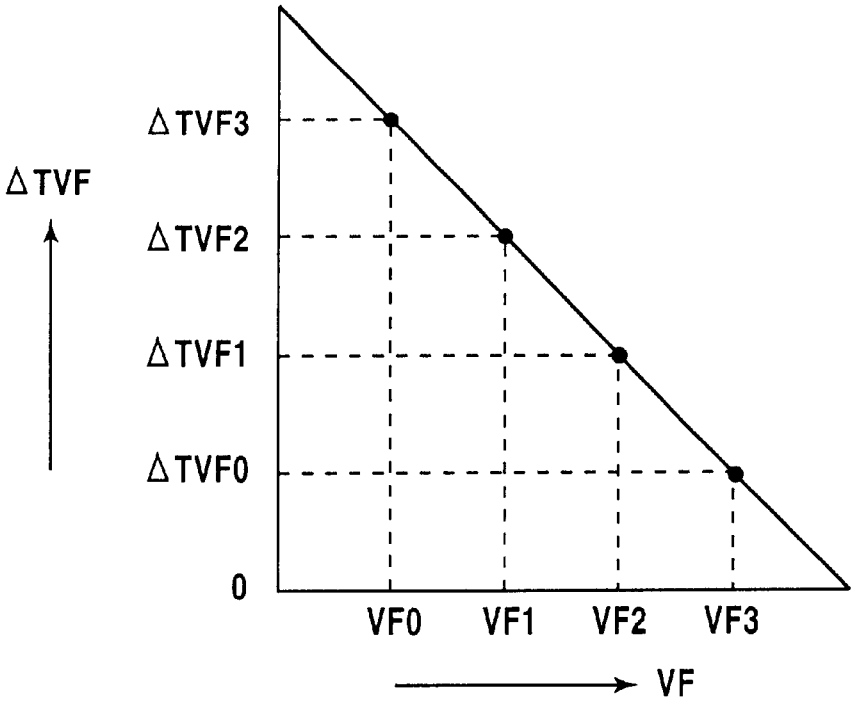
FIG. 8 shows a table for calculating a parameter (fuel amount-dependent correcting time period ΔTVF) used for the abnormality diagnosis.

ΔTVF represents a fuel amount-dependent correcting time period, which is calculated by retrieving a ΔTVF map stored in the memory means of the ECU 5. The ΔTVF map can be set, e.g. as shown in FIG. 8, such that predetermined values ΔTVF0 to ΔTVF3 are provided corresponding, respectively, to predetermined fuel amount values VF0 to VF3. A value of the correcting time period ΔTVF is read from the ΔTVF map or calculated by interpolation.

Figure 9:
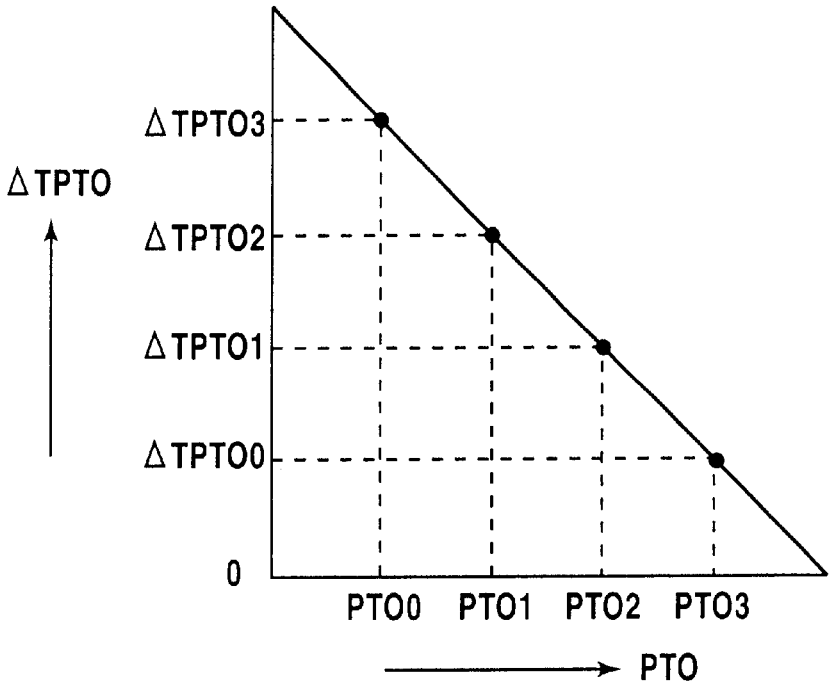
FIG. 9 shows a table for calculating a parameter (tank internal pressure-dependent correcting time period ΔTPTO) used for the abnormality diagnosis.

ΔTPTO represents a tank internal pressure-dependent correcting time period, which is calculated by retrieving a ΔTPTO map stored in the memory means of the ECU 5. The ΔTPTO map can be set, e.g. as shown in FIG. 9, such that predetermined values ΔTPTO0 to ΔTPTO3 are provided corresponding, respectively, to predetermined tank internal pressure values in the open-to-atmosphere condition PTO0 to PTO3. A value of the correcting time period ΔTPTO is read from the ΔTPTO map or calculated by interpolation.

Figure 10:
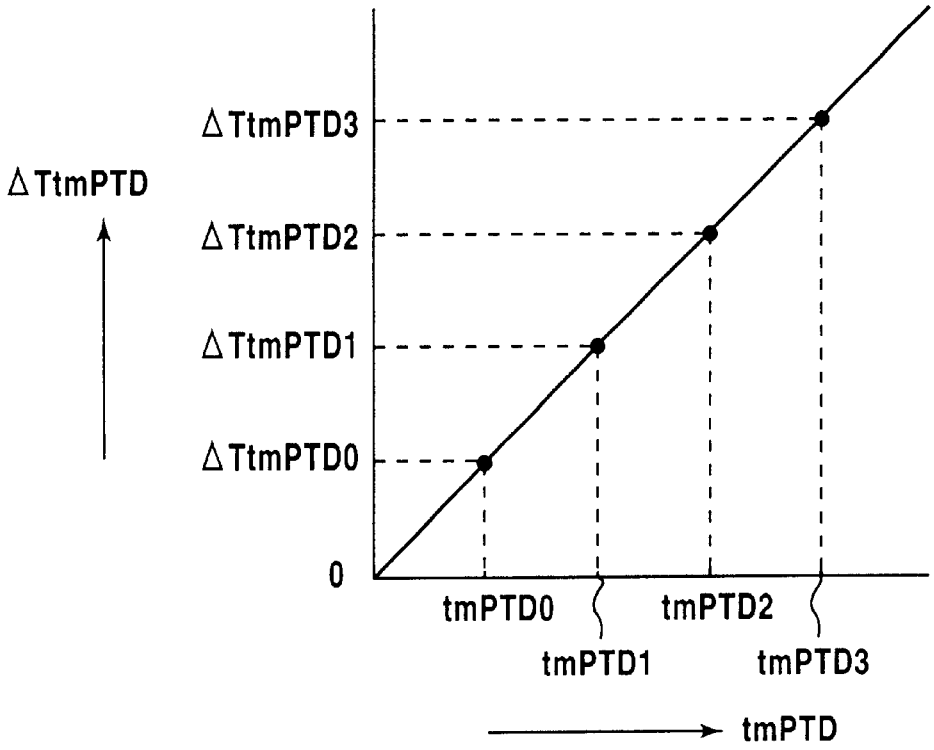
FIG. 10 shows a table for calculating a parameter (negatively-pressurizing time period-dependent correcting time period ΔTtmPT) used for the abnormality diagnosis.

ΔTmPTD represents a negatively-pressurizing time period-dependent correcting time period, which is calculated by retrieving a ΔTtmPTD map stored in the memory means of the ECU 5. The ΔTtmPTD map can be set, e.g. as shown in FIG. 10, such that predetermined values ΔTtmPTD0 to ΔTtmPTD3 are provided corresponding, respectively, to predetermined negatively-pressurizing time periods tmPTD0 to tmPTD3. A value of the correcting time period ΔTtmPTD is read from the ΔTtmPTD map or calculated by interpolation As is clear from FIGS. 7 to 10, the correcting time periods ΔTTF, ΔTVF and ΔTPTO are set to smaller values as the fuel temperature TF, the fuel amount FV, and the tank internal pressure PTO assume higher, larger and higher values, respectively, while ΔTtmPTD is set to a larger value as negatively-pressurizing time period tmPTD assumes a larger value.

Thus, the fourth timer tmPTDCS is set to the correcting time period T4 calculated by the use of the equation (1), and then the evaporative emission control system 11 is set to the leak down check mode at a step S37, followed by terminating the program. More specifically, as described hereinbefore with reference to FIG. 4 (see the time period 4 in FIG. 4), the first and second electromagnetic valves 35, 39 are held ON or energized, respectively, and at the same time the second control valve 36 is turned off or deenergized, followed by terminating the program. In this connection, when the negatively-pressurizing process is completed, the flag FRDC is set to "1", and hence the answer to the question of the step S29 becomes affirmative (YES), so that the step S35 is immediately carried out.

When the answer to the question of the step S35 is affirmative (YES), the program proceeds to a step S38, where it is determined whether or not the correcting time period T4 has elapsed and hence the count value of the fourth timer tmPTDCS is equal to "0". If the answer to this question is negative (NO), the program proceeds to the step S37, where the leak down check is continued, followed by terminating the program. On the other hand, if the answer to the question of the step S38 is affirmative (YES), the program proceeds to a step S39, where an abnormality-determining routine is executed, and then the evaporative emission control system 11 is restored to the normal purging mode at the step S23, followed by terminating the program.

Figure 11:
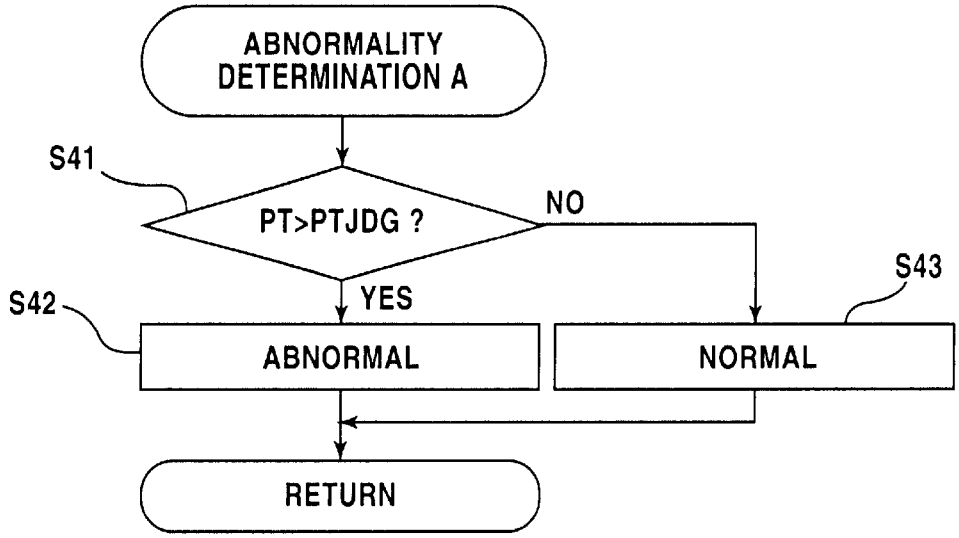
FIG. 11 is a flowchart of an abnormality-determining routine carried out by the program of FIG. 6.

FIG. 11 shows an example (Abnormal Determination A) of the abnormality-determining routine executed at the step S39 (in FIG. 6).

At a step S41, it is determined whether or not the internal tank pressure PT is higher than a reference value PTJDG (e.g. −10 mmHg). If the answer to this question is affirmative (YES), it is judged that the evaporative emission control system 11 suffers from a significant leakage and hence it is determined that the system is in an abnormal condition, at a step S42, followed by returning to the main routine of FIG. 6. On the other hand, if the answer to the question of the step S41 is negative (NO), it is judged that no leakage occurs in the system 11, and hence it is determined that the system is in a normal condition, at a step S43, followed by returning to the main routine of FIG. 6.

Figure 12:
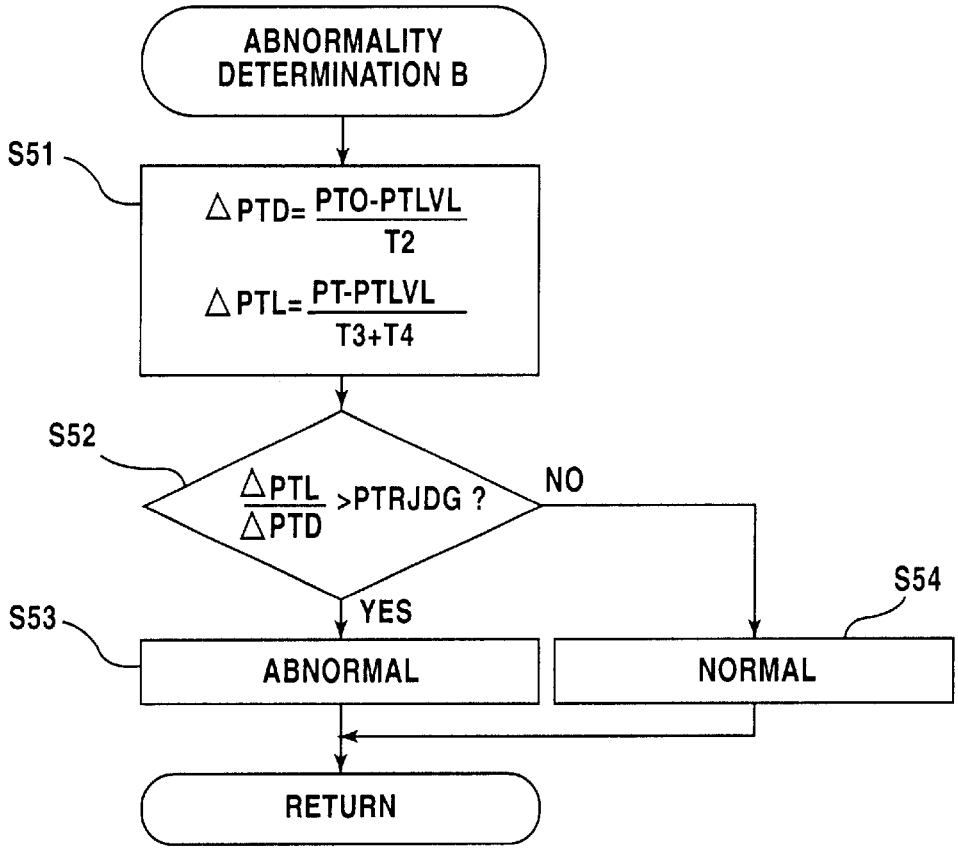
FIG. 12 is a flowchart of another abnormality-determining routine carried out by the program of FIG. 6.

FIG. 12 shows another example (Abnormal Determination B) of the abnormality-determining routine.

First, at a step S51, a calculation is made of a rate of change ΔPTD in the internal tank pressure PT (hereinafter referred to as "the pressure reduction rate") occurring when the evaporative emission control system 11 is negatively-pressurized to a predetermined value PTLVL, i.e. the negatively-pressurized condition thereof is established, by the use of the following equation (2). More specifically, an amount of change in the internal tank pressure PT in establishing the negatively-pressurized condition of the evaporative emission control system 11 is divided by the time period T2 required for the tank internal pressure to be reduced to the predetermined value from the tank internal pressure PTO in the open-to-atmosphere condition, to calculate the pressure reduction rate ΔPTD.

$$\Delta PTD=(PTO-PTLVL)/T2 \ldots \quad (2)$$

Further, a calculation is made of a rate of change ΔPTL in the inside-tank pressure PT (hereinafter referred to as "leakage rate") occurring after the negatively-pressurized condition of the system has been established by the use of the following equation (3). More specifically, an amount of change in the inside-tank pressure PT occurring after the aforementioned condition of the system 11 has been established is divided by a time period required for the leak down check (i.e. the sum of the time period T3 and the correcting time period T4) to obtain the leakage rate ΔPTL.

$$\Delta PTL=(PT-PTLVL)/(T3+T4) \ldots \quad (3)$$

Then at a step S52, the ratio of the leakage rate ΔPTL to the pressure reduction rate ΔPTD is calculated, and it is determined the ratio calculated is larger than a predetermined reference value PTRJDG. If the answer to this question is affirmative (YES), it is judged that the leakage is significant, and hence is determined that the system 11 is in an abnormal condition, at a step S53, followed by returning to the main routine of FIG. 6. On the other hand, if the answer to the question of the step S52 is negative (NO), it is judged that the leakage is insignificant, and hence it is determined that the system 11 is in a normal condition, at a step S54, followed by returning to the main routine of FIG. 6.

As described above, according to the present embodiment, the evaporative emission control system 11 is negatively pressurized, and then in this state, it is determined based the behavior of on the tank internal pressure PT whether or not the evaporative emission control system 11 is in a normal condition. Therefore, it is possible to detect deterioration in the seals provided at the piping connections, the fuel tank 23, etc., which enables to prevent evaporative fuel from being emitted into the air.

Further, since the timing for determining abnormality of the system 11 is corrected based on conditions of the fuel tank (fuel amount, fuel temperature, etc.), it is possible to achieve even more accurate abnormality determination.

Figure 13:
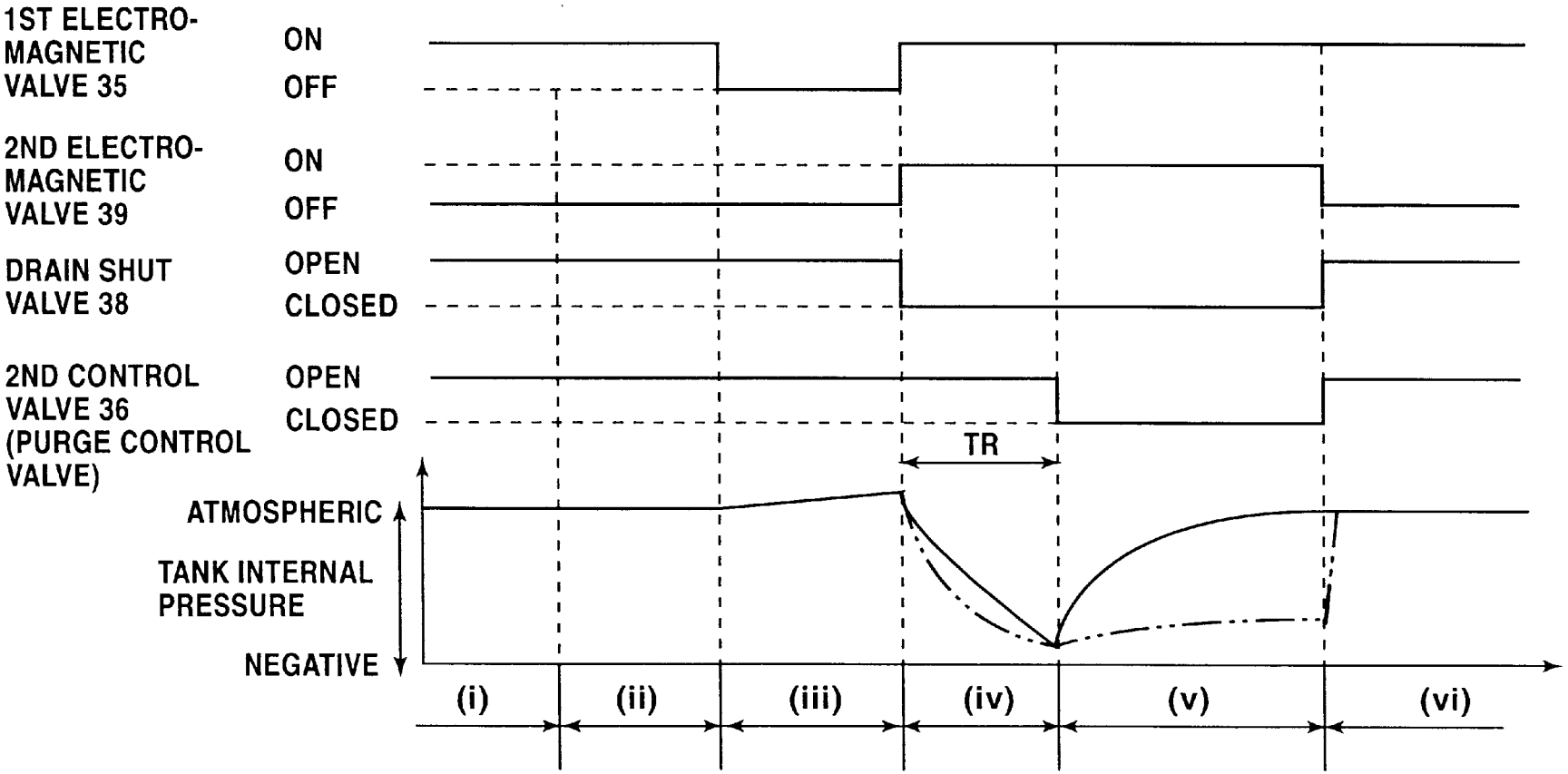
FIG. 13 is a timing chart showing operation of first and second electromagnetic valves, a drain shut valve, and a second control valve, and changes in the tank internal pressure.

FIG. 13 shows changeovers of operative states of the first and second electromagnetic valves 35, 39, the drain shut valve 38, and the second control valve 36 of the system, and changes in the inside-tank pressure PT resulting therefrom, according to a second embodiment of the invention. The operative states of the valves are changed over by respective corresponding signals supplied from the ECU 5 (CPU).

Under the normal operating condition (in the normal purging mode), during a time period indicated by (i) in FIG. 13, the first electromagnetic valve 35 is energized, while the second electromagnetic valve 39 is deenergized. When the ignition switch IGSW is closed and the IGSW sensor detects that the engine 1 is in operation, the purge control valve 36 is turned on or opened. Evaporative fuel generated in the fuel tank 23 then flows via the evaporative fuel-guiding passage 27 into the canister 26, where it is temporarily adsorbed by the adsorbent 24. Further, since the second electromagnetic valve 39 is in the deenergized state under the normal operating condition as mentioned above, the drain shut valve 38 is open to allow the outside air to be supplied to the canister 26 via the air-introducting port 45*a*. Accordingly, the evaporative fuel flowing into the canister 26 is purged together with the air thus introduced, via the second control valve 36 through the purging passage 10 into the intake pipe 2. In this connection, if negative pressure within the fuel tank 23 increases due to cooling thereof caused by the outside air, etc., the negative pressure valve 33 of the two-way valve 34 is opened to return evaporative fuel stored in the canister 26 to the fuel tank 3.

When predetermined monitoring conditions, described in detail hereinafter, are satisfied, the first and second electromagnetic valves 35, 39, and the purge control valve 36 are operated in the following manner to carry out an abnormality diagnosis of the evaporative emission control system 11.

First, the tank internal pressure PT is relieved to the atmosphere, over a time period indicated by (ii) in FIG. 13. More specifically, the first electromagnetic valve 35 is held in the energized state to maintain communication between the fuel tank 23 and the canister 26, and at the same time the second electromagnetic valve 39 is held in the deenergized state to keep the drain shut valve 38 open. Further, the purge control valve 36 is held in the energized state or opened, to relieve the tank internal pressure PT to the atmosphere.

Then, an amount of change in the tank internal pressure PT is measured over a time period indicated by (iii) in FIG. 13.

More specifically, the second electromagnetic valve 39 is held in the deenergized state to keep the drain shut valve 38 open, and at the same time the purge control valve 36 is kept open. However, the first electromagnetic valve 35 is turned off into the deenergized state, to thereby measure an amount of change in the tank internal pressure PT occurring after the fuel tank 23 has ceased to be open to the atmosphere for the purpose of checking an amount of evaporative fuel generated in the fuel tank 23.

Then, the evaporative emission control system 11 is negatively pressurized over a time period indicated by (iv) in FIG. 13. More specifically, the first electromagnetic valve 35 and the purge control valve 36 are held in the energized state, while the second electromagnetic valve 39 is turned on to close the drain shut valve 38, whereby the evaporative emission control system 11 is negatively pressurized by a gas-drawing force developed by negative pressure in the purging passage 10 held in communication with the intake pipe 2. In the figure, TR represents a time period required for establishing the negatively-pressurized condition of the system.

Then, a leak down check is carried out over a time period indicated by (v) in FIG. 13.

More specifically, after the evaporative emission control system 11 is negatively pressurized to a predetermined degree, i.e. after the negatively-pressurized condition of the system is established, the purge control valve 36 is closed, and then a change in the tank internal pressure PT occurring thereafter is checked by the PT sensor 29. If the system 11 suffers from no significant leak of evaporative fuel therefrom, and hence the result of the leak down check shows that there is substantially no change in the tank internal pressure PT as indicated by the two-dot-chain line in the figure, it is judged that the evaporative emission control system 11 is normal, whereas if the system 11 suffers from a significant leak of evaporative fuel therefrom, and hence the result of the leak down check shows that there is a significant change in the tank internal pressure PT toward the atmospheric pressure it is judged that the system 11 is abnormal. Further, if the evaporative emission control system 11 cannot attain the negatively-pressurized condition within a predetermined time period, the leak down check is not carried out, as described hereinafter.

After determining whether or not the system 11 is normal, the system 11 returns to the normal purging mode, as indicated by (vi) in FIG. 13.

More specifically, while the first electromagnetic valve 35 is held in the energized state, the second electromagnetic valve 39 is deenergized and the purge control valve 36 is opened, to thereby perform normal purging of evaporative fuel. In this state, the tank internal pressure PT is relieved to the atmosphere, and hence is substantially equal to the atmospheric pressure.

Next, there will be described, with reference to related figures, the manner of abnormality diagnosis of the evaporative fuel-processing system according to the second embodiment of the invention.

Figure 14A:
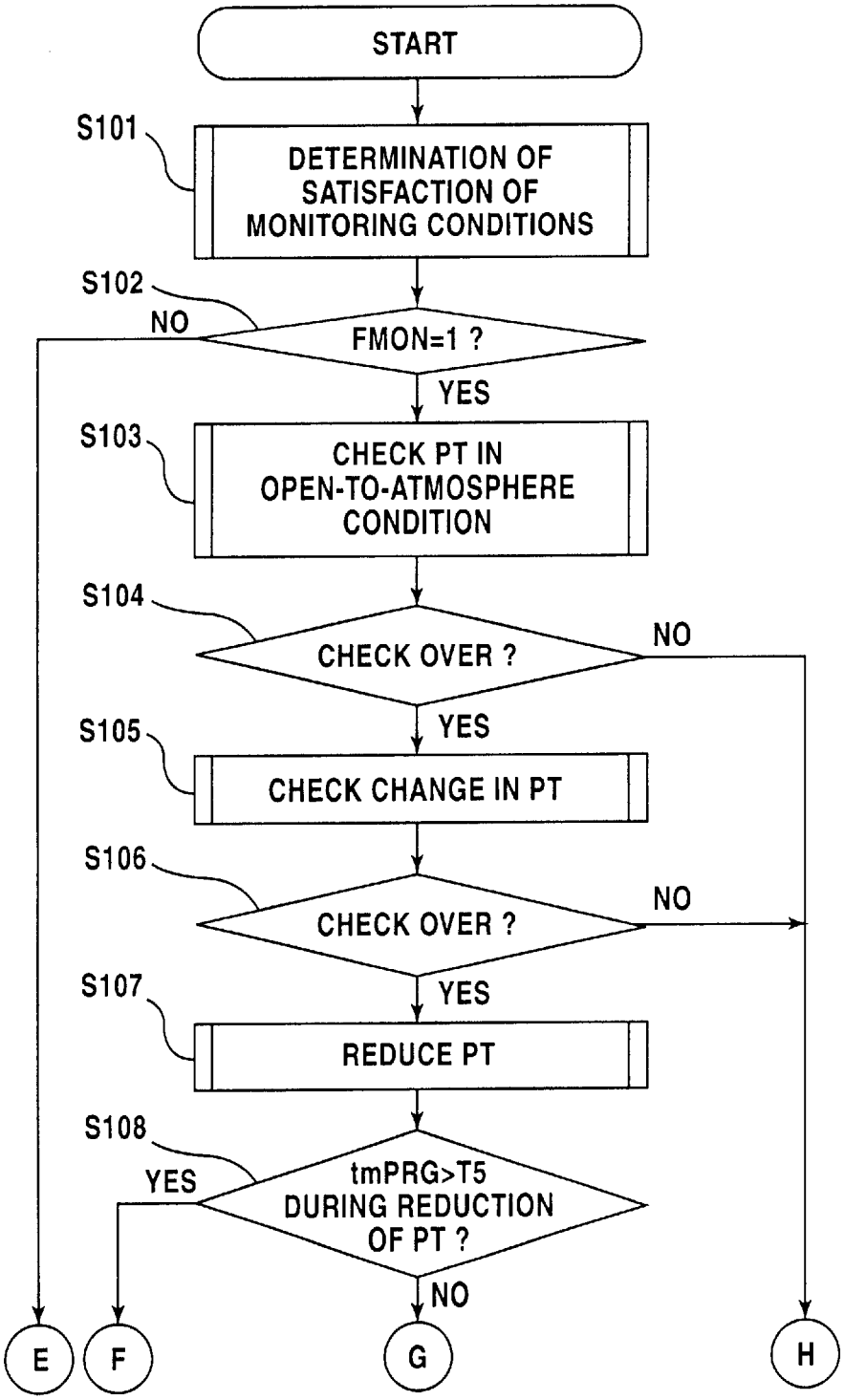
FIG. 14 is a flowchart showing a manner of carrying out an abnormality diagnosis of the evaporative emission control system.
Figure 14B:
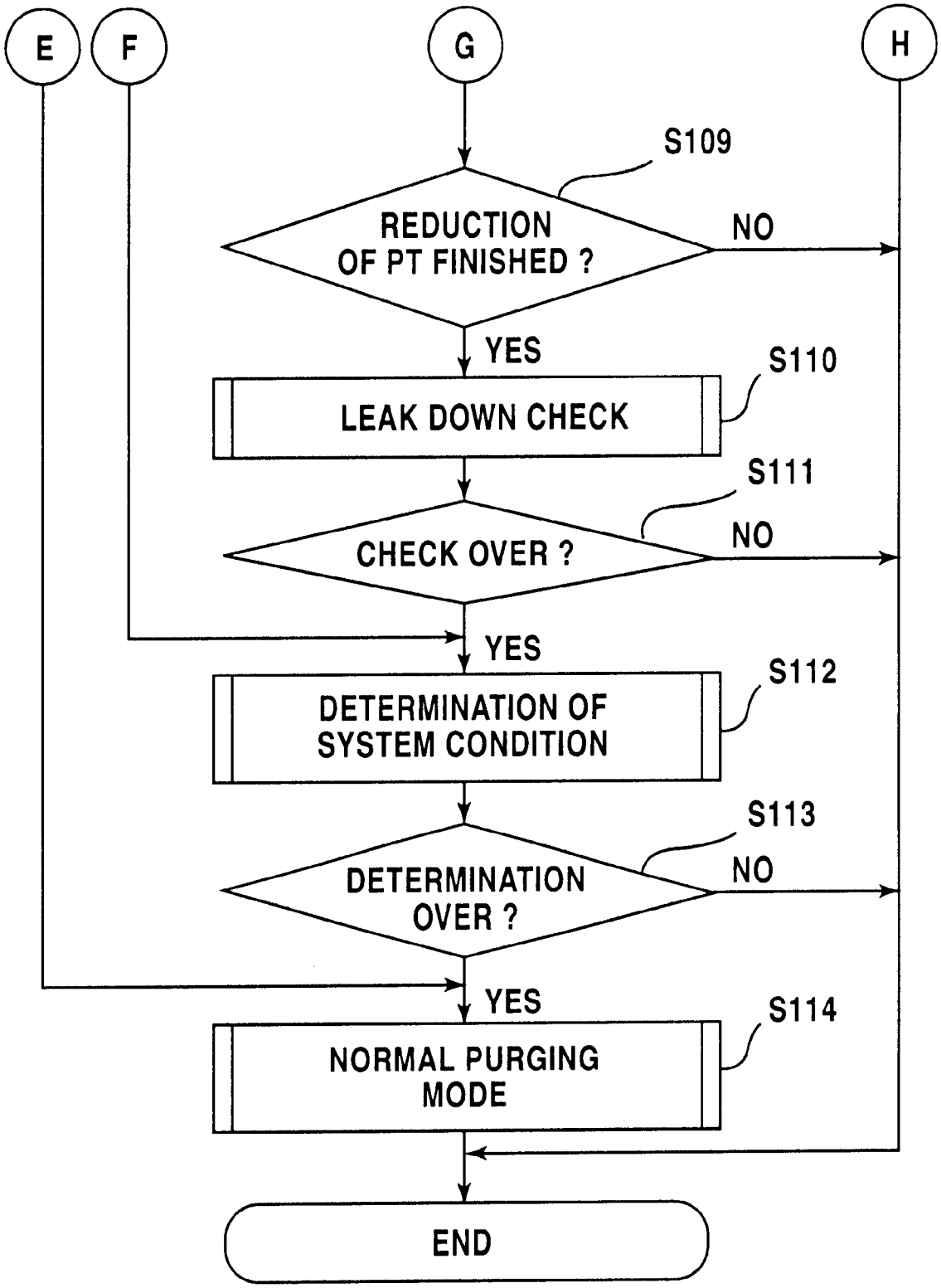

FIG. 14 shows a program for carrying out the abnormality diagnosis of the evaporative emission control system 11, which is executed by the ECU 5 (CPU).

First at a step S101, a routine of determining permission for monitoring is carried out, as described hereinafter. Then, at a step S102, it is determined whether or not the monitoring of the system 11 for abnormality diagnosis is permitted, i.e. a flag FMON is set to "1", at the step S101. If the answer to this question is negative (NO), the first to third control valves 28, 36, 40 are set to respective operative states for the normal purging mode of the system, followed by terminating the program, whereas if the answer to this question is affirmative (YES), the tank internal pressure PT in the open-to-atmosphere condition of the system is checked at a step S103, and it is determined at a step S104 whether or not this check has been completed. If the answer to this question is negative (NO), the program is immediately terminated, whereas if it is affirmative (YES), i.e. if it is judged that the above check has been completed, the first electromagnetic valve 35 is turned off to check a change in the tank internal pressure PT at a step S105, followed by determining at a step S106 whether or not this check has been completed. If the answer to this question is negative (NO), the program is immediately terminated, whereas if it is affirmative (YES), the first to third control valves 28, 36, 40 are operated at a step S107 to establish the negatively-pressurized condition of the evaporative emission control system 11 including the fuel tank 23.

Simultaneously with the start of the negatively pressurizing process at the step S107, a first timer tmPRG incorporated in the ECU5 is started, and it is determined at a step 108 whether or not the count value thereof is larger than a value corresponding to a predetermined time period T5. The predetermined time period T5 is set to such a value as will ensure that the system 11 is negatively pressurized to a predetermined pressure value, i.e. the negatively-pressurized condition of the system 11 is established, if the system is normal. If the answer to the question of the step S108 is affirmative (YES), it is judged that the system 11 cannot be negatively pressurized to the predetermined pressure value due to a hole formed in the fuel tank 23, etc., the program proceeds to a step S112. On the other hand, if the answer to the question of the step S109 is negative (NO), it is determined at a step S109 whether or not the negatively-pressurizing process has been completed, i.e. the negatively-pressurized condition of the system 11 is established. If the answer to this question is negative (NO), the program is immediately terminated, whereas if it is affirmative (YES), a leak down check routine, described in detail hereinafter, is carried out at a step S110 to check whether or not the system 11 is properly sealed, i.e. it is free from a leak of evaporative fuel therefrom in the normal operating mode thereof. Then, at a step S111, it is determined whether or not this check has been completed.

If the answer to this question is negative (NO), the program is immediately terminated, whereas if the answer is affirmative (YES), the program proceeds to a step S112.

At the step S112, a process is carried out for determining whether or not the system 11 is in a normal condition, followed by determining at a step S113 whether this process has been completed. If the answer to this question is negative (NO), the program is immediately terminated, whereas if it is affirmative (YES), the system 11 is set to the normal purging mode at a step S114, followed by terminating the program.

Next, the above steps will be described in detail.

(1) Determination of permission for monitoring (at the step S101 of FIG. 14)

Figure 15:
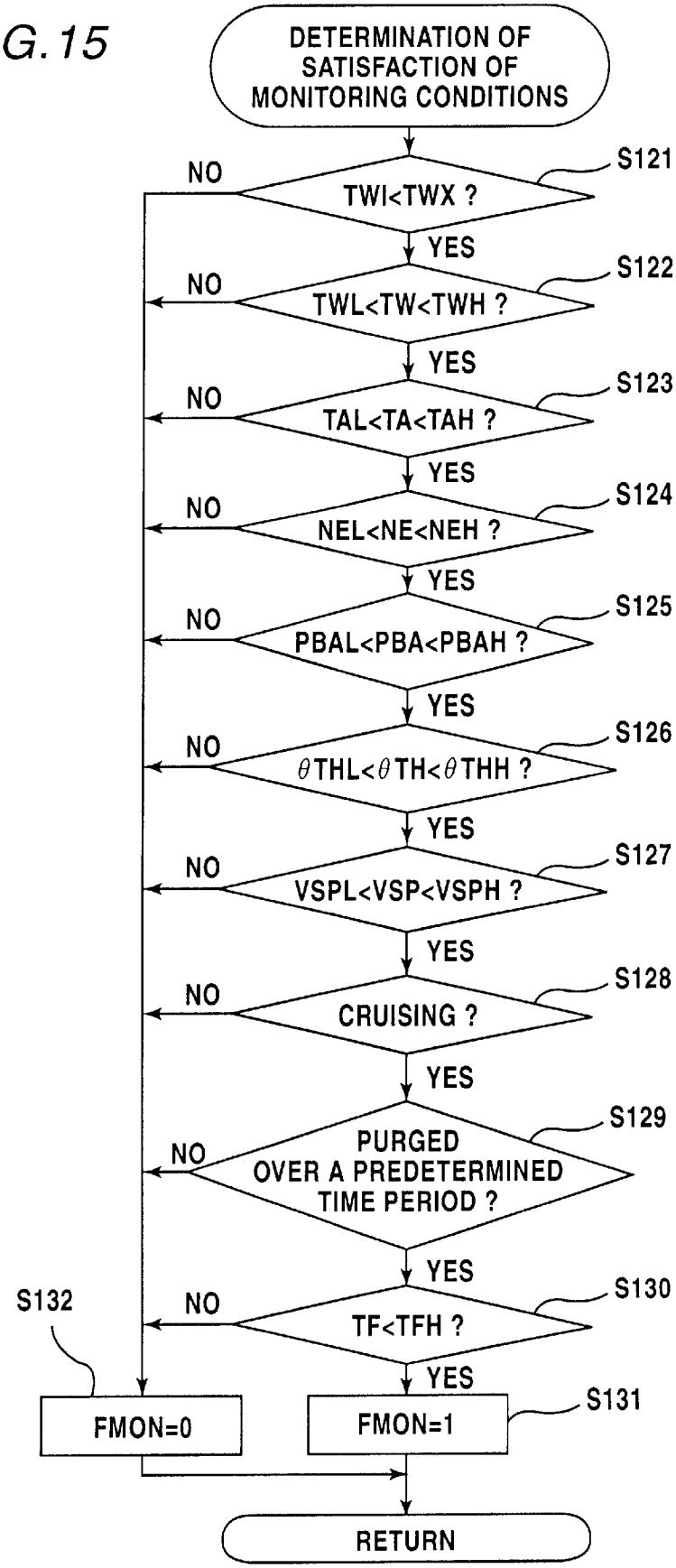
FIG. 15 is a flowchart of a routine for determining whether monitoring conditions are satisfied.

FIG. 15 shows a routine for determining whether or not monitoring of the system 11 for abnormality diagnosis thereof is permitted. This routine is executed as background processing Steps S122 to S123 of this program are identical to the steps S1 to S7 of the program of FIG. 6.

At a step S121, it is determined whether or not the engine coolant temperature TWI is lower than a predetermined value TWX. The abnormality diagnosis of the present embodiment has only to be carried out only after the engine has been out of operation for a long time period (e.g. once per day). First, when the ignition switch IGSW is closed, the engine coolant temperature TWI at the start of the engine is detected and read in, and it is determined at the step S121 in the present routine whether or not the engine coolant temperature TWI is lower than the predetermined value, e.g. 20° C. If the answer to this question is affirmative (YES), i.e. if the engine coolant temperature TWI at the start of the engine is lower than the predetermined value TWX, the program proceeds to a step S122.

At the steps S122 to S128, determinations identical to those of the steps S1 to S7 are carried out. If the answer to the question of the step S128 is affirmative (YES), it is determined at a step S129 whether or not purging of evaporative fuel has been carried out over a predetermined time period. More specifically, in the case where a large amount of evaporative fuel is stored in the canister 26, it takes a longer time period to establish the negatively-pressurized condition of the system 11 due to the resulting large resistance of the canister 26 to permeation of gases or there is a fear that unpreferably rich evaporative fuel be purged into the intake system during the negatively-pressurizing process. Therefore, in the present embodiment, monitoring of the evaporative emission control system 11 is carried out only after the purging of evaporative fuel has been carried over the predetermined time period, to reduce the amount of evaporative fuel adsorbed and stored in the canister 26.

If the answer to the question of the step S129 is affirmative (YES), the program proceeds to a step S130, where it is determined whether or not the fuel temperature TF of fuel contained in the tank 23 detected by the TF sensor 31 is lower than a predetermined value TFH (e.g. 35° C.).

If the answer to this question is affirmative (YES), the flag FMON is set to "1" at a step S131 for permitting monitoring of the system 12 for abnormality diagnosis, followed by terminating the program. On the other hand, if at least one of the answers to the questions of the steps S121 to S130 is negative (NO), the conditions for permitting monitoring are not satisfied, so that the flag FMON is set to "0" at a step S132, followed by terminating the program.

The step S129 is provided in consideration of the fact that the abnormality determination, described hereinafter, cannot be accurately carried out in the case where the fuel temperature TF is higher than the predetermined value (i.e. 35° C.). By inhibiting the monitoring when the fuel temperature TF is high, it is possible to avoid an erroneous determination of abnormality of the system 11. This will be further explained in detail hereinafter.

(2) Check of the tank internal pressure in the open-to atmosphere condition (at the step S103 in FIG. 14)

Figure 16:
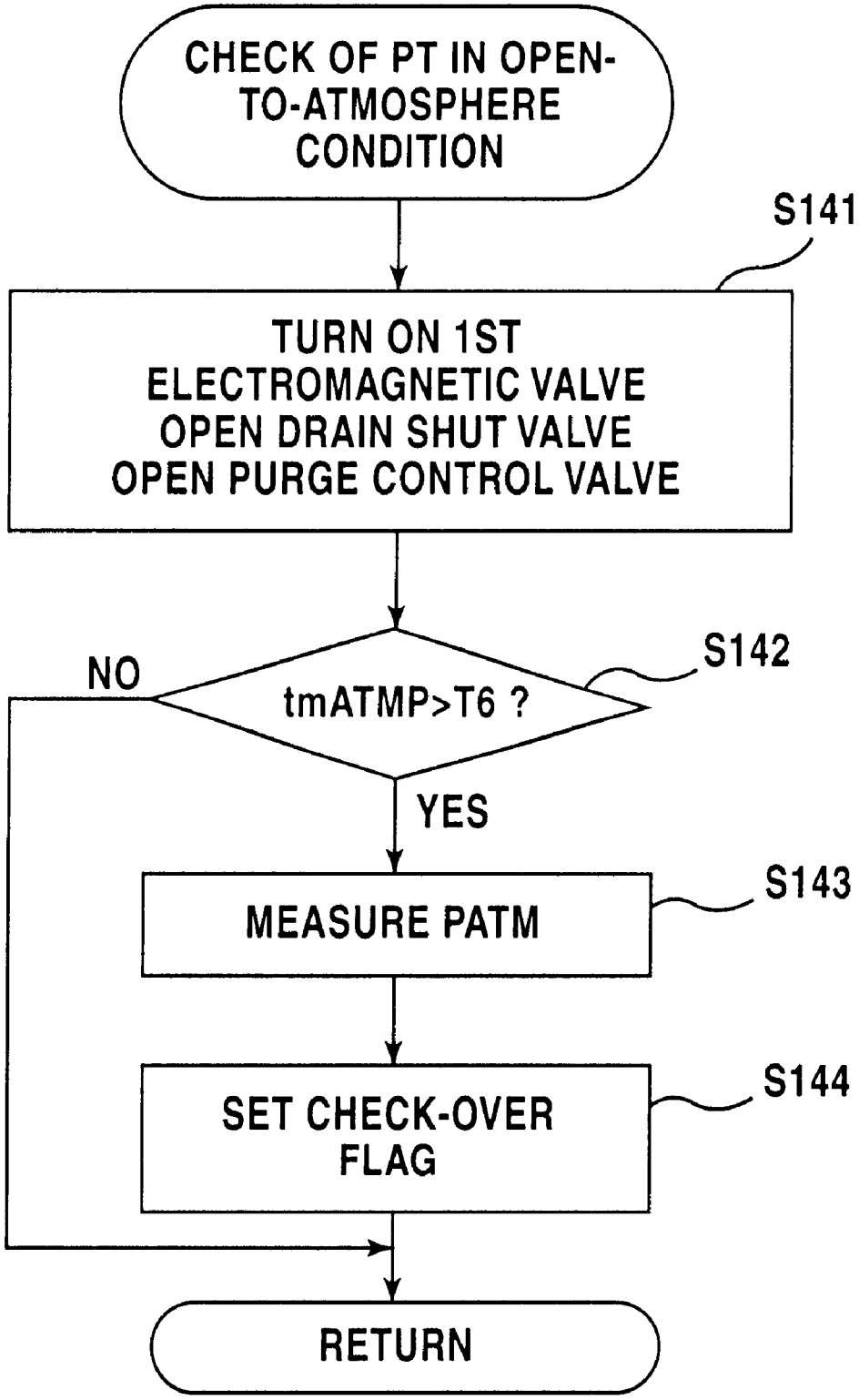
FIG. 16 is a flowchart of a routine for checking tank internal pressure when the interior of the fuel tank is open to the air.

FIG. 16 shows a routine for carrying out the tank internal pressure check in the open-to-atmosphere condition, which is also executed as background processing.

First, at a step S141, the system 11 is set to the open-to-atmosphere mode, and at the same time, a second timer tmATMP is started. More specifically, the first electromagnetic valve 35 is held in the energized state, and at the same time the second electromagnetic valve 39 is held in the deenergized state to keep the drain shut valve 38 open. Further, the purge control valve 36 is kept open. Thus, the tank internal pressure PT is relieved to the atmosphere (See the time period indicated by (ii) in FIG. 13).

Then, at a step S142, it is determined whether or not the count value of the second timer tmATMP is larger than a value corresponding to a predetermined time period T6. The predetermined time period T6 is set to a value, e.g. 4 sec., which ensures that the pressure within the system 11 has been stabilized upon lapse thereof. If the answer to this question is negative (NO), the program is immediately terminated, while if it is affirmative (YES), the program proceeds to a step S143, where the tank internal pressure PATM in the open-to-atmosphere condition is detected by the PT sensor 29 and stored in the ECU 5, and then a checkover flag is set at a step S144, followed by terminating the program.

(3) Check of a change in the tank internal pressure (at the step S105 in FIG. 14)

Figure 17:
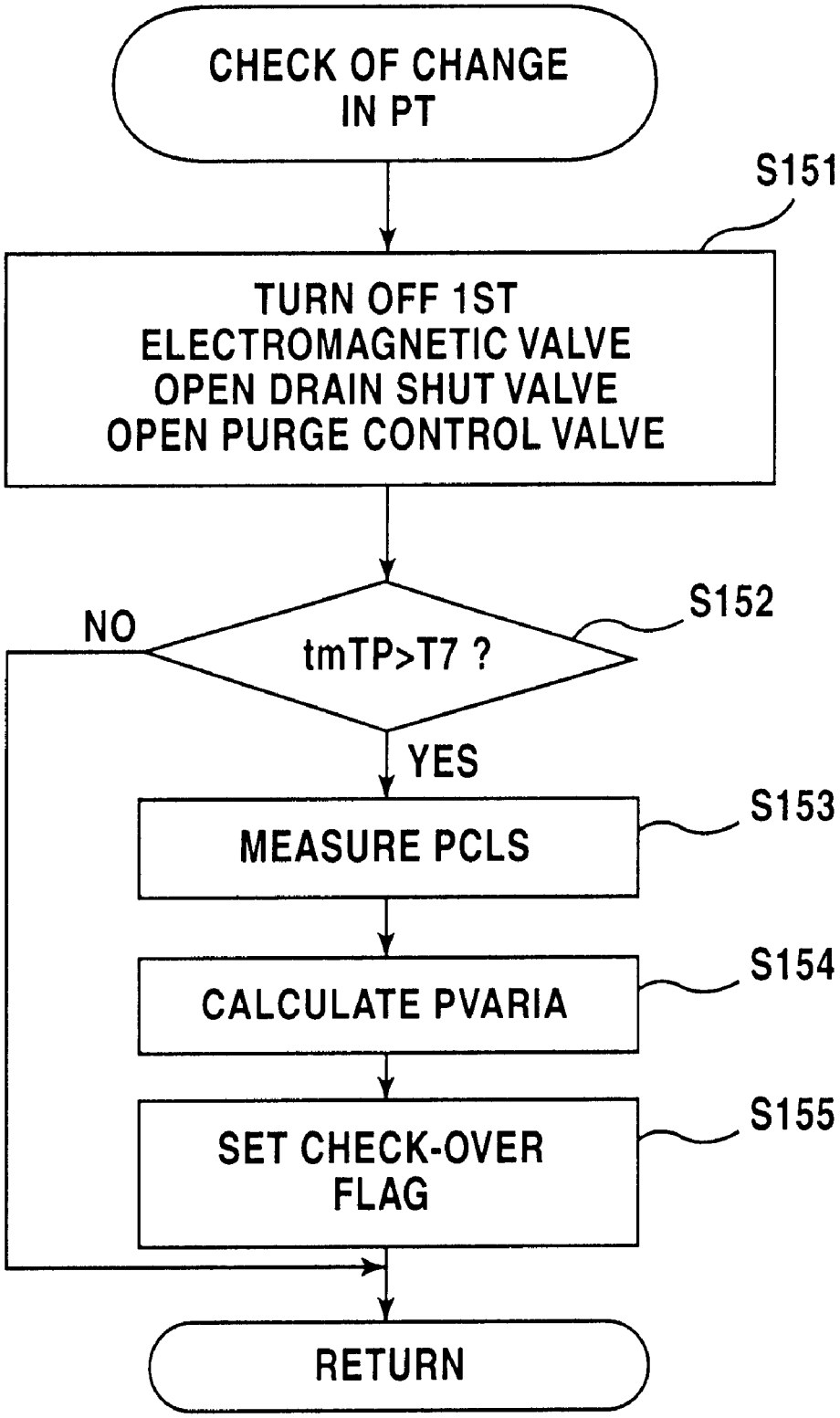
FIG. 17 is a flowchart of a routine for checking changes in the tank internal pressure.

FIG. 17 shows a routine for checking a change in the tank internal pressure, which is executed as background processing.

First, at a step S151, the system 11 is set to a PT change-checking mode, and at the same time a third timer tmTP is started. More specifically, while the purge control valve 36 and the drain shut valve 38 are held open, the first electromagnetic valve 35 is turned off to thereby set the system to the PT change-checking mode (See the time period indicated by (iii) in FIG. 13).

Then, at a step S152, it is determined whether or not the count value of the third timer tmTP is larger than a value corresponding to a predetermined time period T7, e.g. 10 sec. If the answer to this question is negative (NO), the program is immediately terminated, whereas if it is affirmative (YES), the tank internal pressure PCLS after the lapse of the predetermined time period T7 is detected and stored in the ECU 5 at a step S153, followed by calculation of a first rate of change PVARIA in the tank internal pressure by the use of the following equation (4):

$$PVARIA=(PCLS-PATM)/T3 \ldots \quad (4)$$

Then, the first rate of change PVARIA thus calculated is stored in the ECU 5 and a check-over flag is set at a step S155, followed by terminating the program.

(4) Negatively pressurizing process (at the step S107 in FIG. 14)

Figure 18:
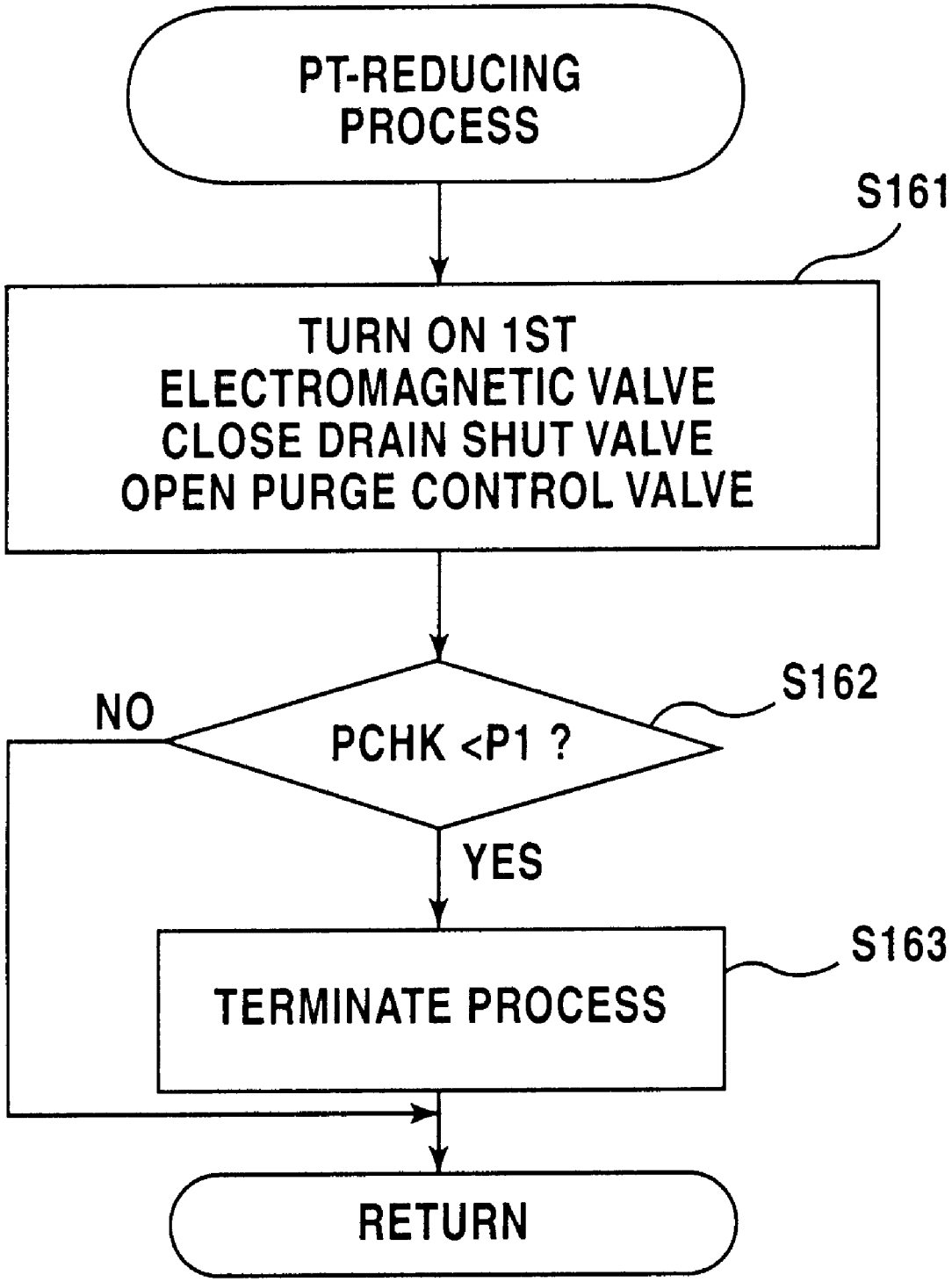
FIG. 18 is a flowchart of a routine for reducing the tank internal pressure.

FIG. 18 shows a routine for carrying out a process of negatively pressurizing the system 11 to establish the negatively-pressurized condition of the system, which is executed as by background processing.

First, at a step S161, the system 11 is set to a negatively-pressurizing mode. More specifically, the purge control valve 36 is kept open, and at the same time the first electromagnetic valve 35 is held in the energized state, and the second electromagnetic valve is turned on to close the drain shut valve 38 (see the time period indicated by (iv) in FIG. 13). In this state, the system 11 is negatively pressurized to a predetermined value by a gas-drawing force created by operation of the engine 1. Then, it is determined at a step S162 whether or not the tank internal pressure PCHK in this mode of the system 11 is lower than a predetermined value PI (e.g. −20 mmHg). If the answer to this question is negative (NO), the program is immediately terminated, whereas if it becomes affirmative (YES), a processor flag is set at a step S63, followed by terminating the program.

(5) Leak down check (at the step S110 in FIG. 14)

Figure 19:
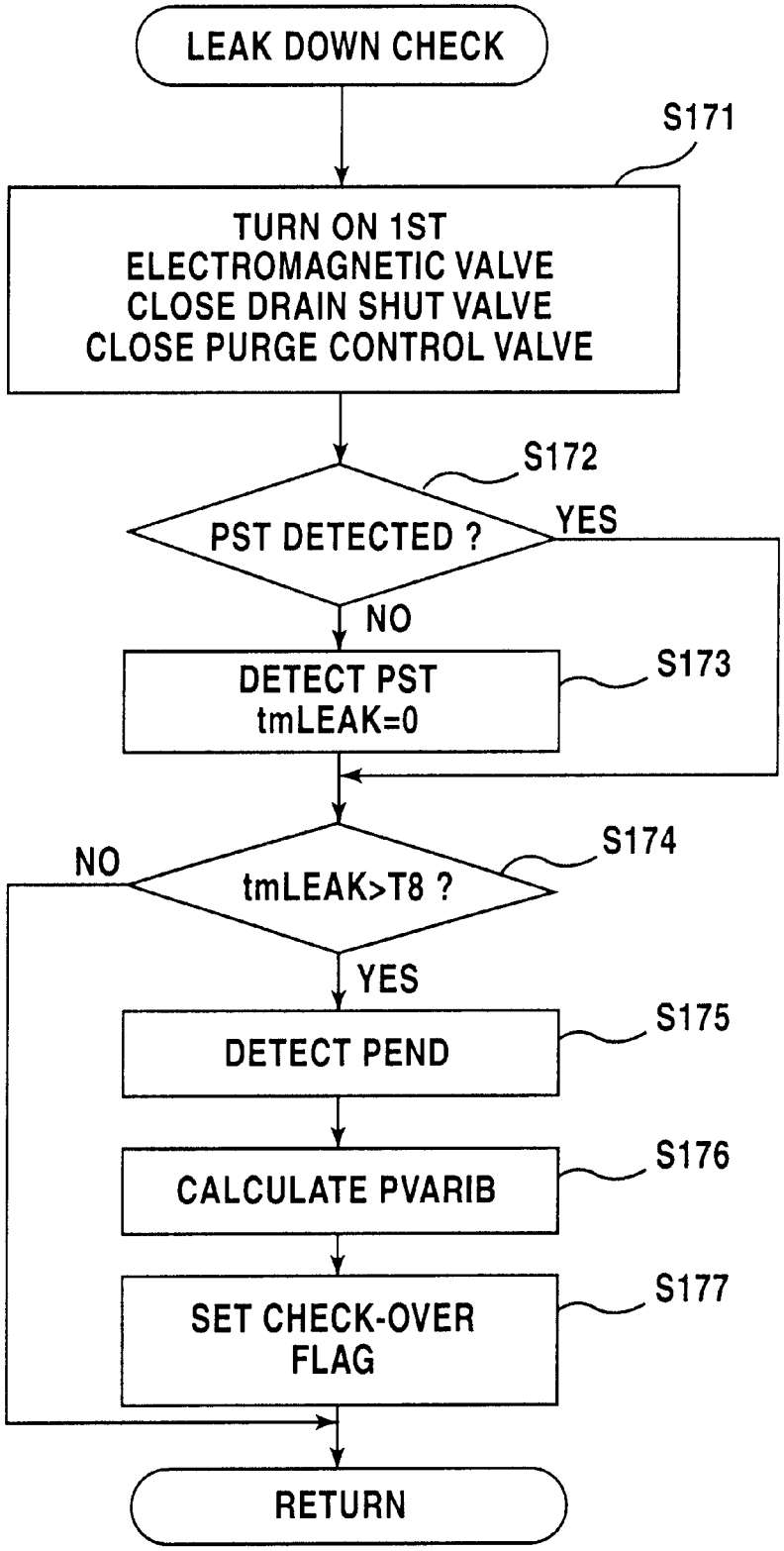
FIG. 19 is a flowchart of a leak down check routine for checking a change rate in the tank internal pressure when the evaporative emission control system is isolated from the intake pipe.

FIG. 19 shows a routine for performing a leak down check of the system 11, which is executed as background processing.

First, at a step S171, the system 11 is set to a leak down check mode. More specifically, while the first electromagnetic valve 35 is held in the energized state, and at the same time the drain shut valve is kept closed, the purge control valve 36 is closed to cut off the communication between the system 11 and the intake pipe 2 of the engine 1 (see the time period (v) in FIG. 13).

Then, the program proceeds to a step S172, where it is determined whether or not the tank internal pressure PST at the start of the leak down check has been detected. In the first execution of this step S172, the answer to this question is negative (NO), so that the program proceeds to a step S173, where the tank internal pressure PST is detected and a fourth timer tmLEAK is started.

Then, it is determined at a step S174 whether or not the count value of the fourth timer tmLEAK is larger than a value corresponding to a predetermined time period T8 (e.g. 10 sec.). In the first execution of this step S172, the answer to this question is negative (NO), so that the program is immediately terminated.

In the following loop, the answer to the question of the step S172 becomes affirmative (YES), so that the program jumps over to the step S174, where it is determined whether or not the count value of the fourth timer tmLEAK is larger than the value corresponding to the predetermined time period T8. If the answer to this question is negative (NO), the program is immediately terminated, whereas if it becomes affirmative (YES), the present tank internal pressure i.e. the tank internal pressure PEND at the end of the leak down check is detected and stored into the ECU 5 at a step S175, followed by calculation of a second rate of change PVARIB in the tank internal pressure PT at a step S176 by the use of the following equation (5):

$$PVARIB=(PEND-PST)/T4 \ldots \quad (5)$$

The second rate of change PVARIB in the tank internal pressure PT thus calculated is stored into the ECU 5, and a check-over flag is set at a step S177, followed by terminating the program.

(6) System condition-determining process (at the step S112 in FIG. 14)

Figure 20:
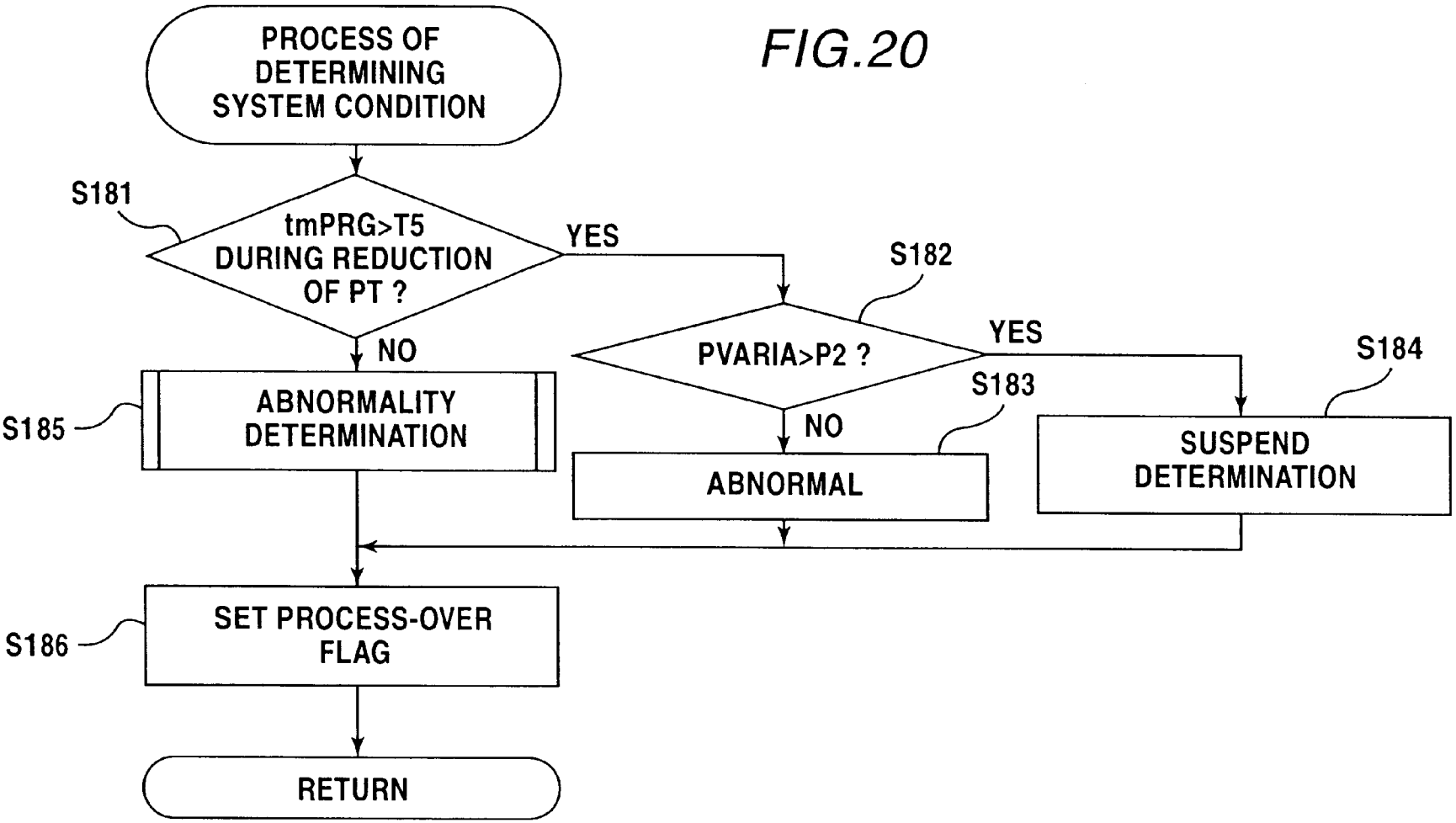
FIG. 20 is a flowchart of a routine for determining conditions of the system.

FIG. 20 shows a routine for carrying out a process of determining a condition of the system 11, which is executed as by background processing.

First, at a step S181, it is determined whether or not the count value of the first timer tmPRG exceeded the predetermined value T5 during the negatively-pressurizing process. If the answer to this question is affirmative (YES), it is judged that the system 11 may suffer from a significant leak of evaporative fuel due to a hole formed in the fuel tank 23, etc., so that the program proceeds to a step S182, where it is determined whether or not the first rate of change PVARIA in the tank internal pressure PT is larger than a predetermined value P2. If the answer to this question is negative (NO), which means that evaporative fuel was not generated at a large rate in the fuel tank 23, and hence the negatively-pressurized condition of the system 11 could have been properly established in the negatively-pressurizing process if the system 11 had been in a normal condition, it is judged that the system 11 suffers from a significant leak of evaporative fuel from the fuel tank 23, piping connections, etc., determining that the evaporative emission control system 11 is abnormal, and then a process-over flag is set at a step S136, followed by terminating the program. On the other hand, if the answer to the question of the step S182 is affirmative (YES), which means that evaporative fuel was generated at a large rate in the fuel tank 23 to increase the tank internal pressure PT, which prevented the system 11 from being negatively pressurized in a proper manner in the negatively-pressurizing process, the determination of the system condition is suspended at a step S184, and then the process over flag is set at the step S186, followed by terminating the program.

On the other hand, if the answer to the question of the step S181 is negative (NO), i.e. if the system 11 was negatively pressurized to the predetermined value, an abnormality determining routine is carried out at a step 185, and then the process-over flag is set at the step S186, followed by terminating the program.

Figure 21:
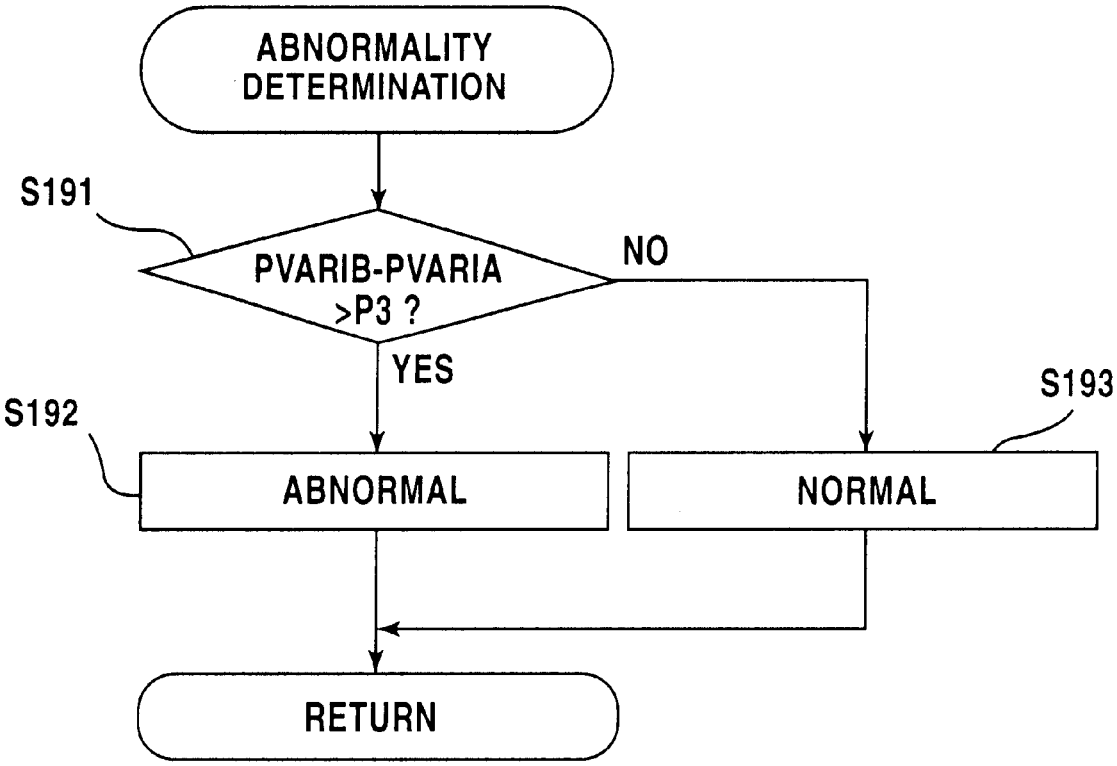
FIG. 21 is a flowchart of a routine for determining occurrence of an abnormality.

The abnormality-determining routine carried out at the step S185 is shown by way of example in FIG. 21.

First, it is determined at a step S191 whether or not the difference between the second change of rate PVARIB in the tank internal pressure PT and the first rate of change PVARIA in same is larger than a predetermined value P3.

Figure 22:
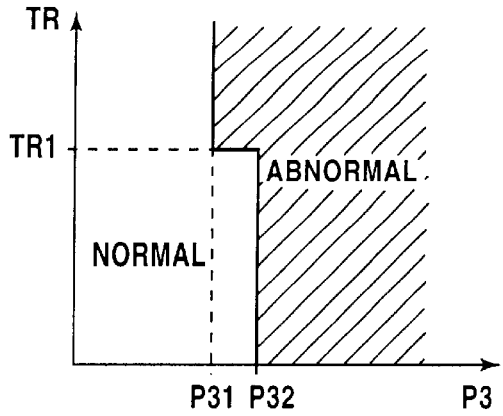
FIG. 22 shows a map used by the routine of FIG. 20 for determining abnormality.

More specifically, in order to determine whether a main factor which has determined the rate of change PVARIB in the tank internal pressure PT is the faulty scaling of the system 11, which means that there occurs a significant leak of evaporative fuel from the system 11 in the normal operating mode thereof, or generation of evaporative fuel from the fuel tank 23, it is determined whether or not the difference between the second rate of change PVARIB and the first rate of change PVARIA is larger than the predetermined value P3. If the second rate of change PVARIB assumes a large value due to generation of a large amount of evaporative fuel from the fuel tank 23, the answer to the question of the step S191 is negative (NO), whereas if the second rate of change PVARIB assumes a large value due to the faulty sealing of the system 11, the answer is affirmative (YES). The predetermined value P3 is set according to the time period TR required for establishing the negatively-pressurized condition of the system 11 in a manner as shown in FIG. 22. More specifically, the predetermined value P3 is set to a value P31 when the time period TR is longer than a predetermined value TR1, whereas it is set to a value P32 (>P31) when the time period TR is shorter than the predetermined value TR1. If the answer to the question of the step S191 is affirmative (YES), it is determined at a step S192 that the evaporative emission control system 11 is abnormal, whereas if the answer is negative (NO), it is determined at a step S193 that the system 11 is normal, followed by terminating the program.

Figure 23:
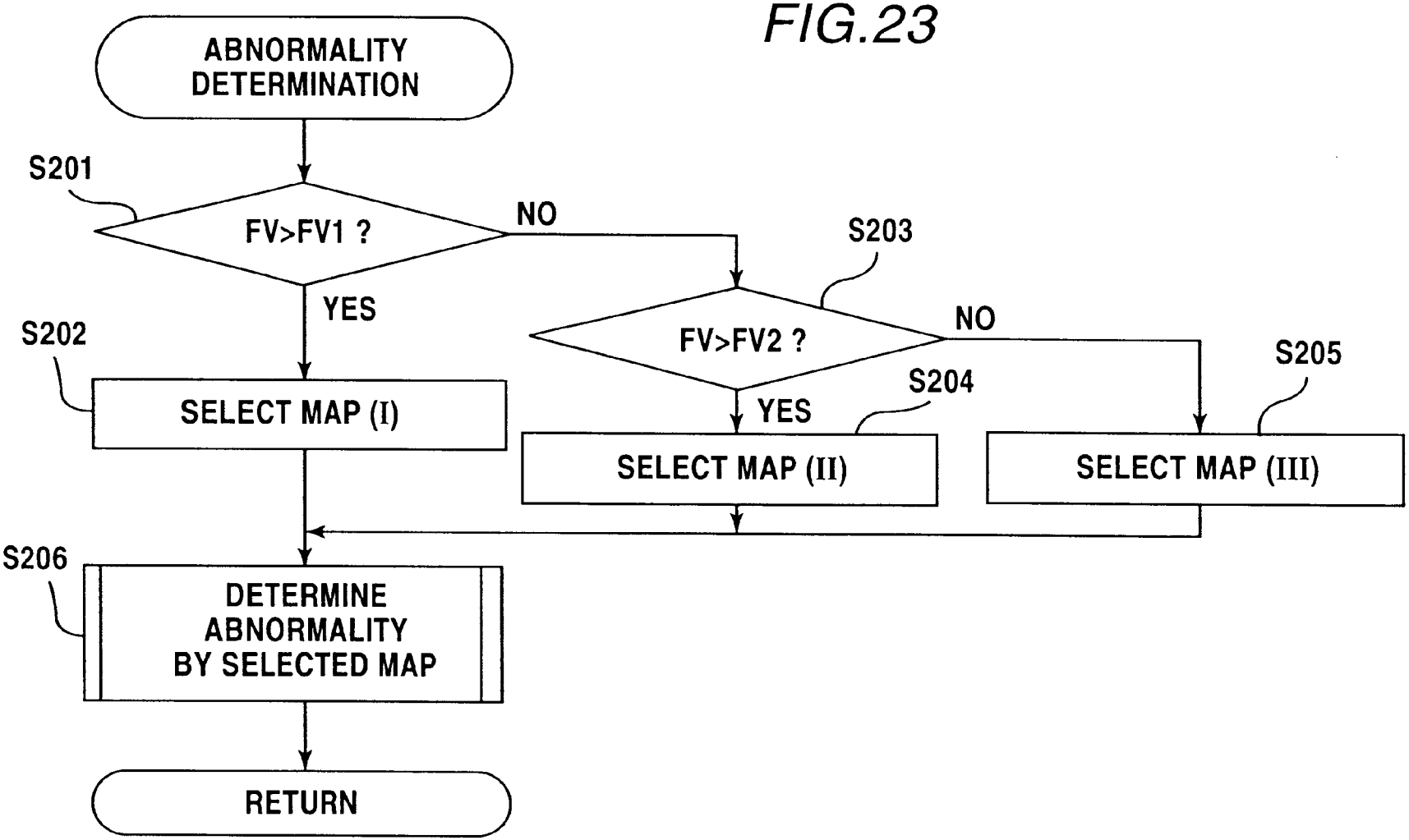
FIG. 23 is a flowchart of another example of the routine for determining occurrence of abnormality, FIG. 24 (I), (II), and (III) show maps used by the routine of FIG. 23 for determining abnormality.

FIG. 23 shows another example of the abnormality-determining routine.

First, at a step S201, it is determined whether or not the fuel amount FV in the fuel tank 23 detected by the FV senor 30 is larger than a first predetermined value FV1, to determine whether or not the fuel tank 23 is Substantially fully filled with fuel. If the answer to this question is affirmative (YES), a map [I] is selected, whereas if the answer is negative (NO), it is determined at a step S203 whether or not the fuel amount FV is larger than a second predetermined value FV2, to determine whether or not the fuel tank 23 is filled half or more with fuel. If the answer to this question is affirmative (YES), a map [II] is selected at a step S204, whereas if the answer is negative (NO), a map [III] is selected at a step S205.

Then, the abnormality-determination is carried out by the use of a selected one of the maps [I] to [III], followed by terminating the program.

Figure 24A:
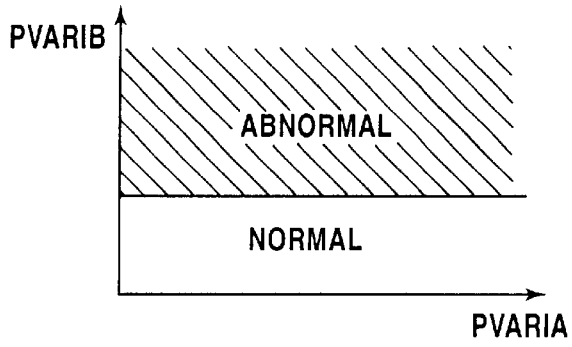
Figure 24B:
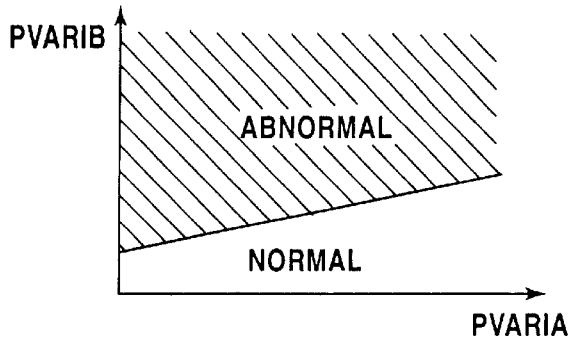
Figure 24C:
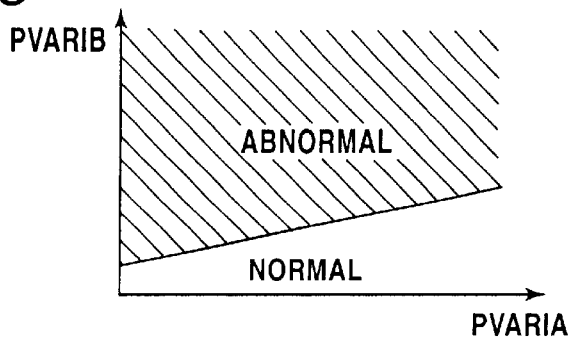

More specifically, as shown in FIGS. 24 [I]–[III], the maps [I] to [III] are each formed such that a normal region and an abnormal region are defined in a manner depending on the relationship between the first rate of change PVARIA in the tank internal pressure PT and the second rate of change PVARIB in the tank internal pressure PT. By retrieving the selected one of the maps, it is determined whether or not the system 11 is normal. In the figures, the hatched sections indicate the abnormal regions.

(7) Normal purging (at the step S114 in FIG. 14)

Figure 25:
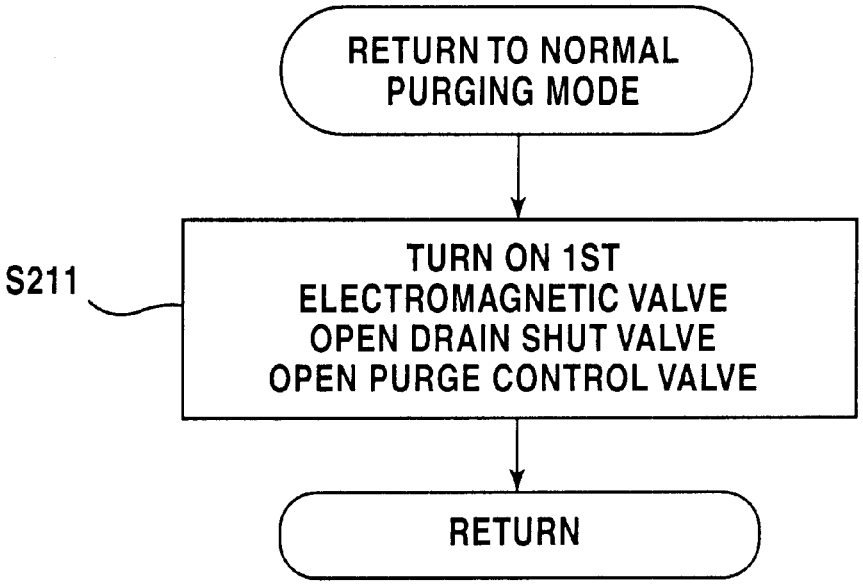
FIG. 25 is a flowchart showing a manner of setting the valves for normal purging.

FIG. 25 shows a routine for restoring the normal purging mode of the system 11, in which the operative states of the valves are specified.

More specifically, the first electromagnetic valve 35 is held in the energized state and the drain shut valve 39 and the purge control valve 36 are opened to thereby set the system to the normal purging mode, at a step S211, followed by terminating the program.

As described heretofore, according to the present embodiment, if the predetermined time period T5 has elapsed during the process of negatively-pressurizing the system 11, it is immediately determined (by jumping-over of the step S108 to S112 in FIG. 14) whether or not the system 11 is abnormal. Therefore, even if the system 11 cannot be negatively pressurized to the predetermined value, it is possible to determine whether or not the system 11 is abnormal.

Further, according to the present embodiment, as shown in FIG. 21 or FIG. 23, the abnormality determination of the system is carried out with reference to the relationship between the first rate of change PVARIA in PT calculated during the PT change check (at the step S105 in FIG. 14; and FIG. 17) and the second rate of change PVARIB in PT calculated during the leak down check (at the step S110 in FIG. 14; and FIG. 19), it is possible to perform an accurate abnormality determination even if evaporative fuel is being generated at a large rate. That is, it can be avoided to erroneously determine that the system is abnormal when evaporative fuel is generated at a large rate.

Figure 26A:
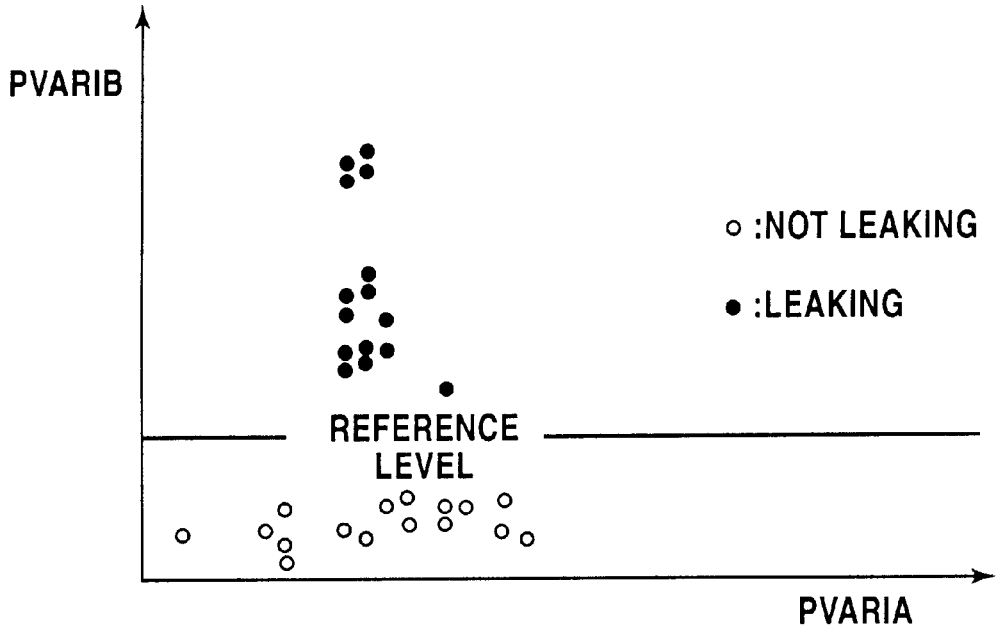
FIGS. 26*a* and *b* are useful in explaining the influence of fuel temperature on the abnormality diagnosis.
Figure 26B:
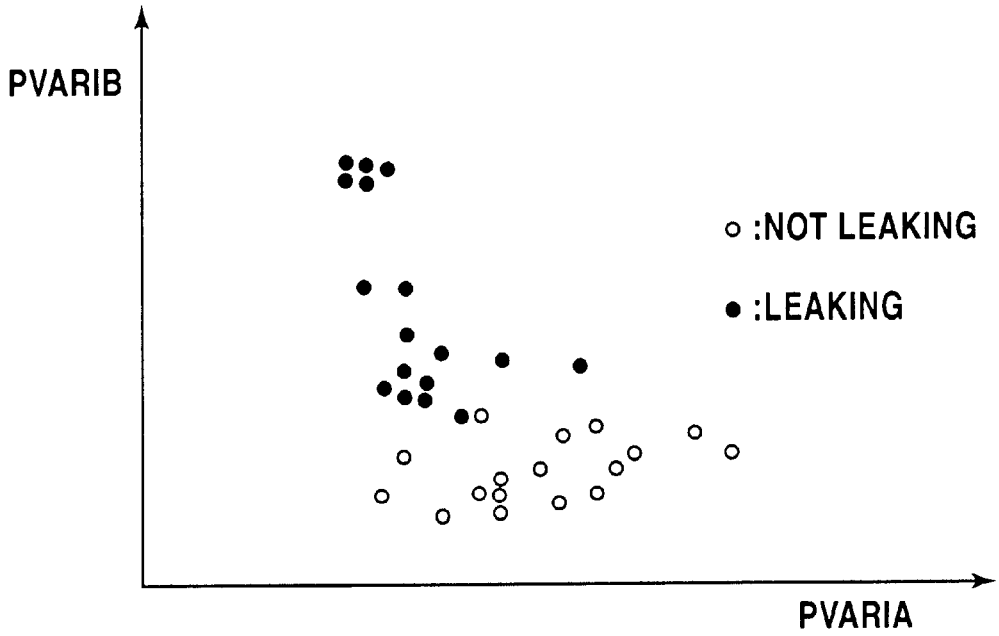
Figure 27:
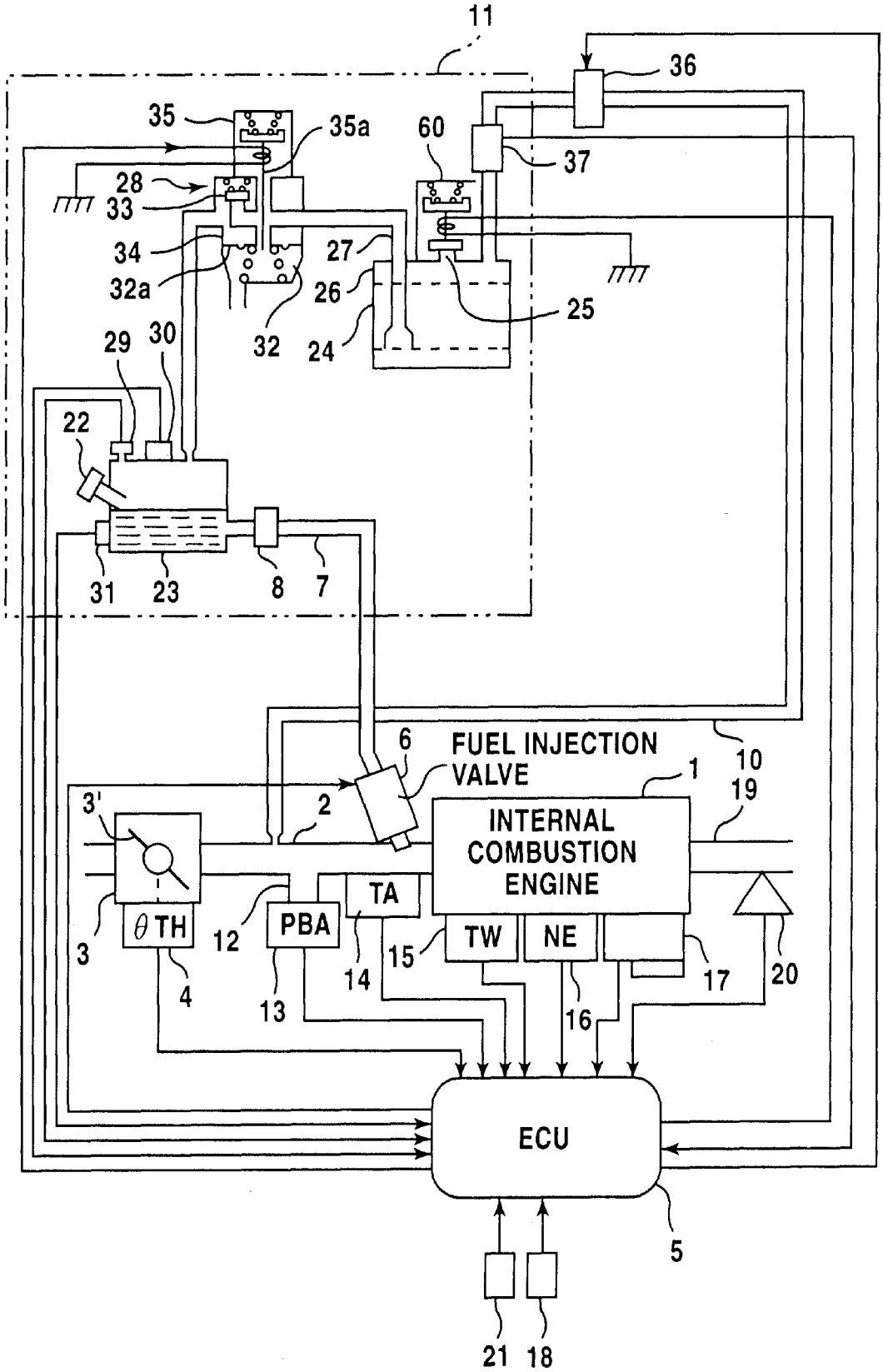
FIG. 27 is a schematic diagram showing the whole arrangement of an internal combustion engine and an evaporative fuel-processing system therefor according to another embodiment of the invention.

Further, when the fuel temperature TF is at a normal value (20° C.), the relationship between the first rate of change PVARIA and the second rate of change PVARIB has a marked border line between the normal region and the abnormal region as shown in FIG. 26*a* depending on whether the system suffers from a leak or not, and hence, it is possible to effect accurate determination of abnormality of the system by the use of a reference level indicated in the figure. However, when the fuel temperature TF is high, e.g. 40° C., the marked border line cannot be discriminated from the relationship between the first and second rates of changes resulting from whether the system suffers from a leak of evaporative fuel or not, making it impossible to effect accurate abnormality determination. Therefore, by the step S130 in FIG. 15, the abnormality determination is inhibited when the fuel temperature TF is high (>TFH), to thereby prevent an erroneous determination of abnormality, which enhances the accuracy of the abnormality determination.

Although, in the above embodiments of the invention, the third control valve 40 is comprised of the drain shut valve 38, the second electromagnetic valve 39, and the negative pressure communication passage 9, this is not limitatine, but the third control valve 40 may be constituted by a single electromagnetic valve 60 for opening and closing the air inlet port 25 to control introduction of air into the consister 26. This contributes to simplification of the construction of the evaporative fuel-processing system of the invention.

What is claimed is:

1. An evaporative fuel-processing system for an internal combustion engine having an intake system, including an evaporative emission control system having a fuel tank, a canister containing an adsorbent, said canister having an air inlet port communicatable with the atmosphere, an evaporative fuel-guiding passage extending between said canister and said fuel tank, a first control valve arranged across said evaporative fuel guiding passage, an evaporative fuel-purging passage extending between said canister and said intake system, and a second control valve arranged across said evaporative fuel-purging passage, said evaporative fuel-processing system having an abnormality-determining system in which comprises:

pressure-detecting means for detecting pressure within said evaporative emission control system;

negatively-pressurizing means for negatively pressurizing said evaporative emission control system; and abnormality-determining means for determining abnormality of said evaporative emission control system based on the pressure within said fuel tank detected after said evaporative emission control system has been negatively pressurized by said negatively-pressurizing means.

2. An evaporative fuel-processing system according to claim 1, wherein said abnormality-determining means determines the abnormality of said evaporative emission control system based on a rate of change in the pressure within said fuel tank occurring before said evaporative emission control system is set to a predetermined negatively-pressurized condition by said negatively-pressurizing means and a rate of change in the pressure within said fuel tank occurring after said predetermined negatively-pressurized condition of said evaporative emission control system has been established.

3. An evaporative fuel-processing system according to claim 1, including tank condition-detecting means for detecting conditions of said fuel tank, wherein said abnormality-determining means carries out abnormality determination when a predetermined time period has elapsed after said evaporative emission control system was negatively pressed said predetermined time period being corrected by a correcting time period set in response to said conditions of said fuel tank detected by said tank condition-detecting means.

4. An evaporative fuel-processing system according to claim 2, including tank condition-detecting means for detecting conditions of said fuel tank, wherein said abnormality-determining means carries out abnormality determination when a time period has elapsed after said evaporative emission control system was negatively pressurized, said predetermined time period being corrected by a correcting time period set in response to said conditions of said fuel tank detected by said tank conditioned-detecting means.

5. An evaporative fuel-processing system according to claim 1, wherein said abnormality-determining means determines abnormality of said evaporative emission control system by comparing a value of a parameter indicative a rate of change in the pressure within said fuel tank detected after said evaporative emission control system has been negatively pressurized by said negatively-pressurizing means with a predetermined reference value, said predetermined reference value being determined according to a time period required for setting said evaporative emission control system to said predetermined negatively-pressurized condition by said negatively-pressurizing means.

6. An evaporative fuel-processing system according to claim 1, including means for purging evaporative fuel stored in said canister for a predetermined time period before the abnormality-determining process is started by said abnormality-determining system.

7. An evaporative fuel-processing system according to claim 1, including fuel temperature-detecting means for detecting the temperature of fuel contained in said fuel tank and determination-inhibiting means for inhibiting execution of abnormality-determining process by said abnormality-determining system when said fuel temperature detected exceeds a predetermined value.

8. An evaporative fuel-processing system for an internal combustion engine having an intake system, including an evaporative emission control system having a fuel tank a canister containing an adsorbent, said canister having an air inlet port communicatable with the atmosphere, an evaporative fuel-guiding passage extending between said canister and said fuel tank, a first control valve arranged across said evaporative fuel-guiding passage, an evaporative fuel-purging passage extending between said canister and said intake system and a second control valve arranged across said evaporative fuel-purging passage, said evaporative fuel-processing system having an abnormality-determining system which comprises:

engine operating condition-detecting means for detecting operating conditions of said engine;

a third control valve for effecting and cutting off the communication of said air inlet port of said canister with the atmosphere;

tank internal pressure-detecting means for detecting pressure within said fuel tank;

negatively-pressurizing means for setting said evaporative emission control system to a predetermined negatively-pressurized condition by controlling said first to third control valves when it is detected by said said engine operating condition-detecting means that said engine is in operation;

a first rate of change-detecting means for detecting a rate of change in the pressure within said fuel tank caused by controlling opening and closing of said fast control valve;

a second rate of change-detecting means for detecting a rate of change in the pressure within said fuel tank caused by closing said second control valve after said negatively-pressurized condition of said evaporative emission control system has been established; and abnormality-determining means for determining abnormality of said evaporative emission control system based on results of detection by said first and second rate of change-detecting means.

9. An evaporative fuel-processing system according to claim 8, including tank condition-detecting means for detecting conditions of said fuel tank wherein said abnormality-determining means carries out abnormality determination when a predetermined time period has elapsed after said evaporative emission control system was negatively pressurized said predetermined time period being corrected by a correcting time period set in response to said conditions of said fuel tank detected by said tank condition-detecting means.

10. An evaporative fuel-processing system according to claim 8, wherein said abnormality-determining means determines abnormality of said evaporative emission control system by comparing a value of a parameter indicative of a rate of change in the pressure within the said fuel tank detected after said evaporative emission control system has been negatively pressurized by said negatively-pressurizing means with a predetermined preference value during the negatively pressurizing, said predetermined reference value being determined according to a time period required for setting said evaporative emission control system to said predetermined negatively-pressurized condition by said negatively-pressurizing means.

11. An evaporative fuel-processing system according to claim 9, wherein said abnormality-determining means determines abnormality of said evaporative emission control system by comparing a value of a parameter indicative of a rate of change in the pressure within the aid fuel tank detected after said evaporative emission control system has been negatively pressurized by said negatively-pressurizing means with a predetermined reference value during the negatively pressurizing, said predetermined reference value being determined according to a time period required for setting said evaporative emission control system to said predetermined negatively-pressurized condition by said negatively-pressurizing means.

12. An evaporative fuel-processing system according to claim 8, wherein said abnormality-determining system includes fuel amount-detecting means for detecting an amount of fuel contained in said fuel tank, said abnormality-determining means determines the abnormality of said evaporative emission control system based on results of detection by said first and second rate of change-detecting means and said fuel amount-detecting means.

13. An evaporative fuel-processing system according to claim 8, including means for purging evaporative fuel stored in said canister for a predetermined time period before the abnormality-determining process is started by said abnormality-determining system.

14. An evaporative fuel-processing system according to claim 8, including fuel temperature-determining means for detecting the temperature of fuel contained in said fuel tank, and determination-inhibiting means for inhibiting execution of abnormality-determining process by said abnormality-determining system when said fuel temperature detected exceeds a predetermined value.

15. An evaporative fuel-processing system for an internal combustion engine having an intake system, including an evaporative emission control system having a fuel tank, a canister containing an adsorbent, said canister having an air inlet port communicatable with the atmosphere, an evaporative fuel-guiding passage extending between said canister and said fuel tank, a first control valve arranged across said evaporative fuel-guiding passage, an evaporative fuel-purging passage extending between said canister and said intake system, and a second control valve arranged across said evaporative fuel-purging passage, said evaporative fuel-processing system having an abnormality-determining system which comprises:

engine operating condition-detecting means for detecting operating conditions of said engine, a third control valve for effecting and cutting off the communication of said air inlet port of said canister with the atmosphere, tank internal pressure-detecting means for detecting pressure within said fuel tank;

negatively-pressurizing means for setting said evaporative emission control system to a predetermined negatively-pressurized condition by controlling said first to third control valves when it is detected by said said engine operating condition-detecting means that said engine is in operation; and abnormality-determining means for effecting a determination as to whether or not said evaporative emission control system is abnormally functioning, when a predetermined time period has elapsed during the negatively-pressurizing by said negatively-pressurizing means.

16. An evaporative fuel-processing system according to claim 15, wherein said abnormality-determining system includes evaporative fuel generation rate-detecting means for detecting a parameter of an amount of evaporative fuel generated per unit time within said fuel tank, said abnormality-determining means determining that said evaporative emission control system is abnormal on condition that said parameter indicative of said amount of evaporative fuel generated per unit time within said fuel tank is smaller than a predetermined value.

17. An evaporative fuel-pressing system according to claim 15, including means for purging evaporative fuel stored in said canister for a predetermined time period before the abnormality-determining process is started by said abnormality-determining system.

18. An evaporative fuel-processing system according to claim 15, including fuel temperature-detecting means for detecting the temperature of fuel contained in said fuel tank, and determination-inhibiting means for inhibiting execution of abnormality-determining process by said abnormality-determining system when said fuel temperature detected exceeds a predetermined value.

19. An evaporative fuel-processing system for an internal combustion engine having an intake system, including an evaporative emission control system having a fuel tank, a canister containing an adsorbent, said canister having an air inlet port communicatable with the atmosphere, an evaporative fuel-guiding passage extending between said canister and said fuel tank, an evaporative fuel-purging passage extending between said canister and said intake system, and a purge control valve arranged across said evaporative fuel-purging passage, said evaporative emission control system comprising:

a drain shut valve disposed to establish and shut off communication between said air inlet port of said canister and the atmosphere;

pressure-detecting means for detecting pressure within said evaporative emission control system;

negatively-pressurizing means for negatively pressurizing said evaporative emission control system; and abnormality-determining means for determining abnormality of said evaporative emission control system based on an extent to which the pressure is maintained within said evaporative emission control system, said extent being detected based on the pressure within said evaporative emission control system detected by said pressure-detecting means, after said evaporative emission control system has been negatively pressured by sad negatively-pressurizing means.

20. An evaporative fuel processing system according to claim 19, wherein said abnormality-determining means includes pressure-holding means for holding the pressure within said evaporative emission control system after said evaporative emission control system has been negatively pressurized by said negatively-pressurizing means, said abnormality-determining means detecting the extent to which the pressure is maintained within said evaporative emission control system based on the pressure within said evaporative emission control system detected by said pressure-detecting means, while the pressure within said evaporative emission control system is held by said pressure-holding means.

21. An evaporative fuel-processing system according to claim 20, wherein said negatively-pressurizing means opens said purge control valve and at the same time closes said drain shut valve to negatively pressurize said evaporative emission control system, and said pressure-holding means closes said purge control valve and at the same time closes said drain shut valve to hold the pressure within said evaporative emission control valve.

22. An evaporative fuel-processing system according to claim 20, wherein said abnormality-determining means determines the extent to which the pressure is maintained within said evaporative emission control means, by detecting a change in the pressure within said evaporative emission control system detected by said pressure-detecting means over a predetermined time period, and determines that there is an abnormality in said evaporative emission control system, when the detected change exceeds a predetermined value.

*23. In an abnormality-determining system of an evaporative fuel-processing system of a vehicle for supplying and controlling an evaporative fuel adsorbed and held in a canister to an internal combustion engine in accordance with an operating condition of the internal combustion engine, comprising an improvement wherein said abnormality determining system includes:*

*first engine coolant temperature determining means for determining whether engine coolant temperature is lower than a first predetermined value at an initial start-up of said internal combustion engine;*

*second engine coolant temperature determining means for determining when said engine coolant temperature is above a second predetermined value only if said first engine coolant temperature determining means initially determines said engine coolant temperature is lower than said first predetermined value;*

*engine-operating condition-detecting means for detecting one or more predetermined engine operating conditions and/or vehicle running conditions when said second engine coolant temperature determining means determines said engine coolant temperature is above said second predetermined value; and*

*abnormality-determining means for determining an abnormality of said evaporative fuel-processing system when said engine operating condition detecting means determines one or more predetermined engine operating conditions and/or vehicle running conditions are satisfied.*

*24. In an abnormality-determining system of an evaporative fuel-processing system of a vehicle for supplying and controlling an evaporative fuel adsorbed and held in a canister to an internal combustion engine in accordance with operating conditions of said internal combustion engine, comprising an improvement wherein said abnormality determining system includes:*

*abnormality determining means for determining an abnormality of said evaporative fuel-processing system only when engine coolant temperature is greater than a first predetermined value; and*

*means for activating said abnormality-determining means at engine start-up only when said engine coolant temperature is less than a second predetermined value which is less than said first predetermined value.*

*25. An abnormality-determining system for an evaporative fuel-processing system of a vehicle, the evaporative fuel-processing system including a fuel tank coupled to an intake passage of an internal combustion engine via an evaporative fuel-purging passage, a canister disposed in line with said evaporative fuel-purging passage for adsorbing and holding evaporative fuel from said fuel tank, said canister having an air inlet port for introducing outside air into said evaporative fuel-processing system, and check valve means disposed between said fuel tank and said canister for maintaining a predetermined pressure in said fuel tank, said abnormality-determining system comprising:*

*pressure-determining means for determining pressure within said evaporative fuel processing system;*

*first control valve means, arranged across an evaporative fuel guiding passage which is between said fuel tank and said canister, for opening and closing said evaporative fuel passage in response to a first control signal;*

*second control valve means, arranged across said evaporative fuel-purging passage between said canister and said intake passage, for opening and closing the evaporative fuel-purging passage in response to a second control signal;*

*a third control valve means for effecting and cutting off communication with said air inlet port of said canister with the atmosphere in response to a third control signal; and*

*an abnormality-determining means for determining presence or absence of evaporative fuel leakage in said evaporative fuel-processing system when one or more predetermined engine operating conditions and/or vehicle running conditions are satisfied, said abnormality determining means selectively generating said first, second and third control signals to determined presence or absence of evaporative fuel leakage.*

*26. An abnormality determining system according to claim 23, wherein said second predetermined value is greater than said first predetermined value.*

*27. An abnormality determining system according to claim 23, wherein said one or more conditions comprise a vehicle velocity state or an engine rotational speed state.*

*28. An abnormality determining system according to claim 27, wherein said one or more conditions further comprise one of a vehicle velocity fluctuation over time, intake pipe pressure, and throttle opening degree.*

*29. An abnormality determining system according to claim 25, wherein said one or more conditions include an engine coolant temperature being greater than a predetermined value.*

*30. An abnormality determining system according to claim 29, wherein said one or more conditions comprise a vehicle velocity state or an engine rotational speed state.*

*31. An abnormality determining system according to claim 30, wherein said one or more conditions further comprise one of vehicle velocity fluctuation over time, intake pipe pressure, and throttle opening degree.*

*32. An abnormality determining system according to claim 24, wherein said abnormality-determining means includes engine-operating condition-detecting means for detecting one or more predetermined engine operating conditions and/or vehicle running conditions before executing said abnormality-determining means, said one or more predetermined engine operating conditions and/or vehicle running conditions being from a group including a vehicle velocity state, an engine rotational speed state, a vehicle velocity fluctuation over time, an engine rotational speed, and a throttle opening degree.*

*33. An abnormality determining system for detecting an abnormality in an evaporative fuel processing system having*

*a fuel tank storing an amount of fuel, an evaporative fuel-guiding passage extending between said fuel tank and a canister, an evaporative fuel-purging passage through which fuel vapor stored in said canister is purged into an intake passage of an internal combustion engine and a purge control valve arranged across said evaporative fuel-purging passage to allow a purge operation by opening of said purge control valve, said abnormality-determining system comprising:*

*negatively-pressurizing means for introducing a negative pressure from said intake passage of said internal combustion engine into said evaporative fuel processing system;*

*pressure-detecting means for detecting pressure within said evaporative fuel processing system when negative pressure is introduce therein by said negatively-pressurizing means;*

*abnormality-determining means for determining an abnormality in said evaporative fuel processing system based upon pressure in said evaporative fuel processing system, said determination using values supplied by said pressure-detecting means; and*

*negative pressure controlling means for controlling said negatively-pressurizing means so as to prohibit negatively-pressurizing of said negatively-pressurizing means while said abnormality-determining means is determining the abnormality, when said negative pressure is introduced into said evaporative fuel processing system by said negatively-pressurizing means wherein suctioning of said fuel vapor collected in the fuel tank with air into the engine results in fluctuation of an air-fuel ratio.*

*34. An abnormality-determining system according to claim 33, further comprising a control valve for effecting and cutting off communication of an air inlet port of said canister with the atmosphere wherein;*

*said negatively-pressurizing means comprises controlling means for controlling said purge control valve and control valve, negative pressure inside said intake passage being introduced into said evaporative fuel processing system by closing said control valve and opening said purge control valve.*

*35. An abnormality determining system for detecting an abnormality in an evaporative fuel processing system having a fuel tank storing an amount of fuel, an evaporative fuel-guiding passage extending between said fuel tank and a canister, an evaporative fuel-purging passage through which fuel vapor stored in said canister is purged into an intake passage of an internal combustion engine and a purge control valve arranged across said evaporative fuel-purging passage to allow a purge operation by opening of said purge control valve, said abnormality-determining system comprising:*

*negatively-pressurizing means for introducing a negative pressure from said intake passage of said internal combustion engine into said evaporative fuel processing system;*

*pressure-detecting means for detecting pressure within said evaporative fuel processing system when negative pressure is introduce therein by said negatively-pressurizing means;*

*negative pressure controlling means for controlling said negatively-pressurizing when said negative pressure is introduced into said evaporative fuel processing system by said negatively-pressurizing means wherein suctioning of said fuel vapor collected in the fuel tank with air into the engine results in fluctuation of an air-fuel ratio; and*

*abnormality-determining means for determining an abnormality in said evaporative fuel processing system based upon pressure in said evaporative fuel processing system, said determination using values supplied by said pressure-detecting means, said system further comprising*

*means for determining a fuel amount stored in said canister and said negatively-pressurizing means is activated based upon said fuel amount stored in said canister.*

*36. An abnormality determining system according to claim 35, said fuel amount stored in said canister is determined by time elapsed since said purge control valve was opened.*

*37. An abnormality determining system according to claim 36, wherein said opening and closing of said purge control valve is controlled to be linearly changed.*

*38. An abnormality determining system according to claim 35, wherein said abnormality determining means determines the existence or non-existence of a malfunction of said evaporative fuel processing system by comparing a rate of pressure change inside said evaporative fuel processing system over a predetermined period of time with a predetermined value, said rate of pressure change being obtained by using pressure values detected and supplied by said pressure detecting means.*

* * * * *